United States Patent [19]

Heller et al.

[11] Patent Number: 5,194,161

[45] Date of Patent: Mar. 16, 1993

[54] MATERIALS AND METHODS FOR ENHANCED PHOTOCATALYZATION OF ORGANIC COMPOUNDS WITH PALLADIUM

[75] Inventors: Adam Heller, Austin, Tex.; Heinz Gerischer, Berlin, Fed. Rep. of Germany

[73] Assignee: Board of Regents, The University of Texas System, Austin, Tex.

[21] Appl. No.: 846,348

[22] Filed: Mar. 5, 1992

Related U.S. Application Data

[60] Continuation-in-part of Ser. No. 629,664, Dec. 14, 1990, which is a division of Ser. No. 412,317, Sep. 25, 1989, Pat. No. 4,997,576.

[51] Int. Cl.$^5$ .............................. C02F 1/30; C02F 1/32
[52] U.S. Cl. ..................................... 210/748; 210/763; 210/925
[58] Field of Search ................ 210/748, 749, 758, 763, 210/922, 925, 908; 502/222, 223, 326, 338, 339, 343, 350

[56] References Cited

U.S. PATENT DOCUMENTS

| 2,885,366 | 5/1959 | Iler | 252/313 |
|---|---|---|---|
| 3,437,502 | 4/1969 | Werner | 106/300 |
| 3,518,206 | 6/1970 | Sowards | 252/446 |
| 3,562,153 | 2/1971 | Tully et al. | |
| 3,661,495 | 5/1972 | Johnston | 431/7 |
| 3,661,496 | 5/1972 | Johnston | 431/7 |
| 3,661,497 | 5/1972 | Castelucci et al. | 431/7 |
| 3,695,810 | 10/1970 | Heagler | 431/2 |
| 3,698,850 | 10/1972 | Sparlin | 431/8 |
| 3,726,441 | 4/1973 | Keyes et al. | 222/178 |
| 3,923,533 | 12/1975 | Hammell et al. | 106/54 |
| 4,086,514 | 2/1989 | Langford et al. | 502/159 |
| 4,255,285 | 3/1982 | Engelbach et al. | 252/443 |
| 4,474,852 | 10/1984 | Craig | 428/403 |
| 4,699,720 | 10/1987 | Harada et al. | 210/762 |
| 4,751,005 | 6/1988 | Mitsui et al. | 210/759 |
| 4,843,306 | 10/1974 | Whittington et al. | 431/8 |
| 4,861,484 | 8/1989 | Lichton et al. | 210/748 |
| 4,863,608 | 9/1989 | Kawai et al. | 210/748 |
| 4,892,712 | 1/1990 | Robertson et al. | 210/748 |
| 4,997,576 | 3/1991 | Heller et al. | 210/748 |
| 5,098,577 | 3/1992 | McLaughlin et al. | 210/679 |

FOREIGN PATENT DOCUMENTS

| 76028 | 7/1987 | Australia . |
| 196334 | 10/1986 | European Pat. Off. . |
| 234875 | 9/1987 | European Pat. Off. . |
| 3825905 | 3/1990 | Fed. Rep. of Germany . |

OTHER PUBLICATIONS

Payne et al., "Photochemistry of petroleum in water", Environ. Sci. Technol., vol. 19, No. 7, pp. 569-579 (1984).

Gesser et al., "Photooxidation of n-Hexadecane Sensitized by Zanthone", Environmental Science & Technology, vol. 11, No. 6, pp. 605-608 (1977).

Pilpel, "Photo-oxidation of Oil Films Sensitized by Naphthalene Derivatives", Institute of Petroleum, IP 75-007 (1975).

Cretney, et al., "Biodegradation of a Chemically Dispersed Crude Oil", EPA/API/USCG Oil Spill Conference, pp. 37-43 (Mar. 24, 1981).

(List continued on next page.)

Primary Examiner—Stanley S. Silverman
Assistant Examiner—Neil M. McCarthy
Attorney, Agent, or Firm—Arnold, White & Durkee

[57] ABSTRACT

A bead having an exterior surface which is at least partially coated with a material that under illumination and in the presence of air is capable of accelerating the oxidation of organic compounds floating on water. The coated bed is water floatable and has an equivalent diameter of less than about 2 mm, preferably on the order of 10-200 microns. These coated beads can be used to accelerate under illumination oxidation of a floating oil film (e.g. from an oil spill) by dispersing the coated beads in the film and allowing them to be exposed to solar illumination and oxygen. Alternate embodiments of the beads may be used with microbes to biodegrade oil, and may be used to aggregate oil.

4 Claims, 23 Drawing Sheets

OTHER PUBLICATIONS

American petroleum Institute, "Oil Spills: their fate and impact on the marine environment", Oil Companies International Marine Forum/International petroleum Industry Environmental Conservation Association Report, pp. 1-26 (Mar. 1980).

Handen, "Photochemical Degradation of Petroleum Hydrocarbon Surface Films on Seawater", Marine Chemistry, vol. 3, pp. 183-195 (1975).

Anikiyev et al., "Estimate of the Efficiency of Photochemical Degradation of Oil Pollutants in the Ocean", Dokl. Earth Sci. Sect., vol. 259, pp. 218-221 (1981).

Parker, et al., "The Effect of Some Chemical and Biological Factors on the Degradation of Crude Oil at Sea", Water Pollution by Oil, pp. 237-244 (1970).

Philpel, "Le soleil, notre allie dans la lutte contre la pollution", Chimia, vol. 28, No. 5, pp. 261-262 (1974).

Heller et al., "Controlled Suppression and Enhancement of the Photoactivity of Titanium Dioxide (Rutile) Pigment", The Journal of Physical Chemistry, vol. 91, No. 23, pp. 5987-5991 (1987).

Heller, "Hydrogen-Evolving Solar Cells", Science, vol. 223, pp. 1141-1148 (1984).

Soloman, et al., "2.4 Photochemical Activity of Titanias", Chemistry of Pigments and Fillers, pp. 62-84 (1981).

Kalyanasundaram, "Semiconductor Particulate Systems for Photocatalysis and Photosynthesis-H. Photooxidation of Organic Materials", Energy Resources Through Photochemistry and Catalysis, p. 232-234 (1983).

Sakata, et al., "10.VII. Application of Photocatalytic Reaction to Organic Synthesis", Energy Resources Through Photochemistry and Catalysis, pp. 355-358 (183).

Sax, "Dangerous Properties of Industrial Materials", p. 1172 (4th ed. 1975).

Colling, et al., "The Durability of Paint Films Containing Titanium Dioxide-Contraction, Erosion and Clear Layer Theories", Advances in Organic Coatings Science and Technology, vol. IV, pp. 205-238 (1982).

Berner, et al., "Light Stabilization of Automotive Coatings", Advances in Organic Coatings Science & Technology, vol. IV, pp. 334-354 (1981).

Thomas, "Single-layer $TiO_2$ and multilayer $TiO_2$ optical coatings prepared from colloidal suspensions", Applied Optics, vol. 26, No. 21, pp. 4688-4691 (1987).

On-line Dialog Search Reports.

International Search Report on International Application No. PCT/US90/06809.

Second International Search Report on International Application No. PCT/US90/06809.

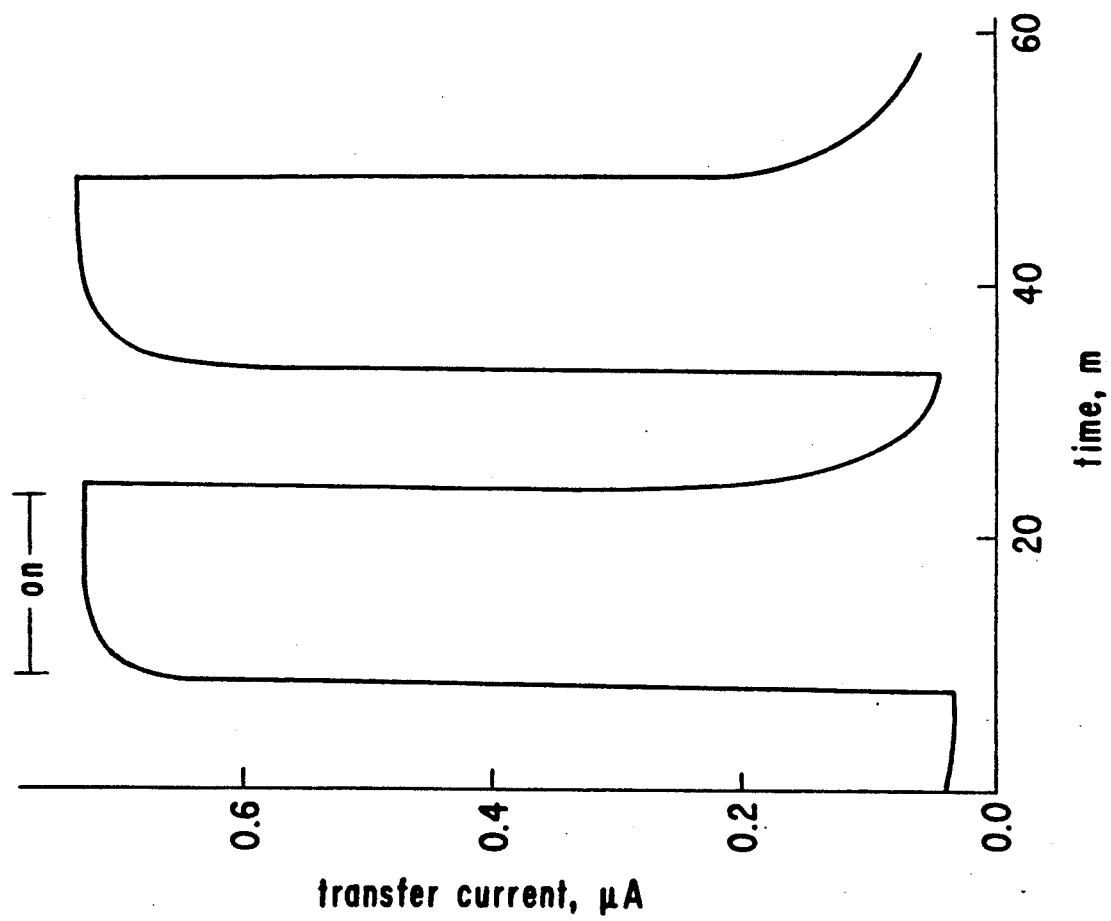

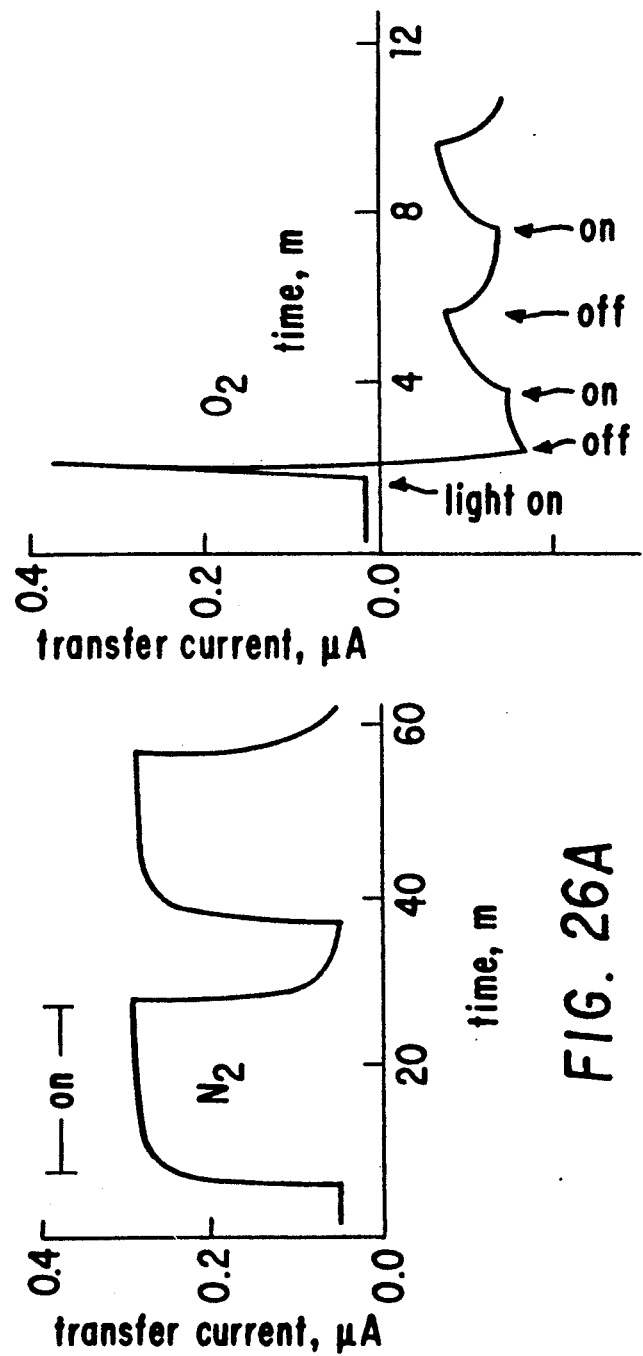

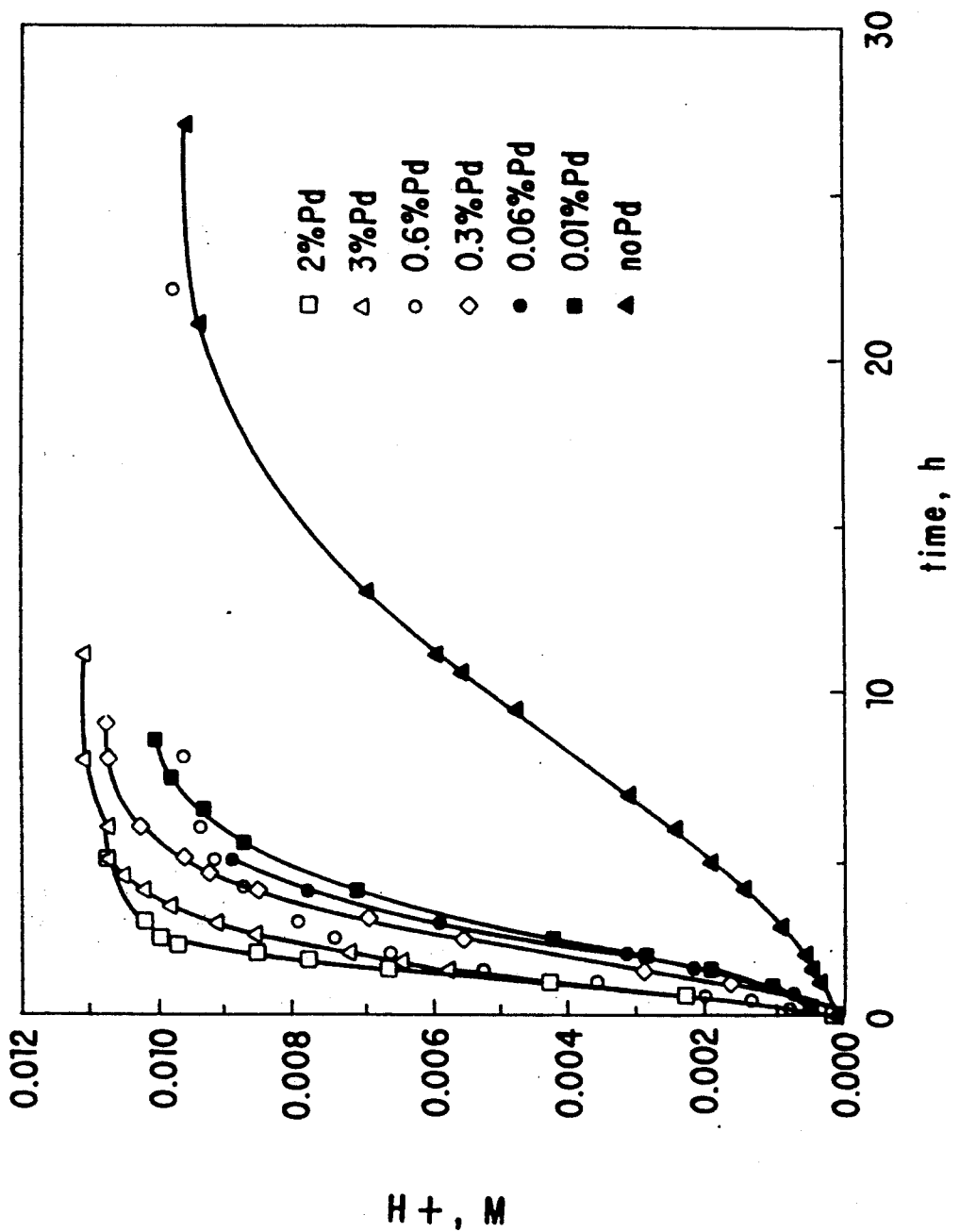

MATERIALS AND METHODS FOR ENHANCED PHOTOCATALYZATION OF ORGANIC COMPOUNDS WITH PALLADIUM

GOVERNMENT INTEREST

Research relating to the subject matter in this application may have been partially or fully funded under U.S. Department of Energy Grants DE-FG05-90ER12101-A001,A002. The U.S. government may have an ownership interest in the subject matter described herein.

CROSS-REFERENCE TO RELATED PATENT APPLICATIONS

This application is a continuation-in-part of Ser. No. 07/629,664 filed Dec. 14, 1990, which is a division of U.S. application Ser. No. 07/412,317, filed Sep. 25, 1989, now U.S. Pat. No. 4,997,576.

BACKGROUND OF THE INVENTION

1. Field of the Invention

This invention relates to materials and methods for aggregating, biodegrading, and photocatalyzing the oxidation of organic compounds floating on water, such as those typically resulting from an oil spill.

2. Description of Related Art

Oil spills in the world's oceans and seas have a potentially damaging effect on the environment. Oil entering the seas can have a harmful impact not only upon the marine ecosystem, but also upon commercial and recreational resources of coastal areas.

Organic compounds invade the world's waterways from many sources in addition to oil spills. For example, refineries located along rivers often introduce substantial amounts of organic products and waste into the water. Organic compounds from landfills and waste sites can leach down to water tables below the earth's surface. Recreational motorboats often exhaust and leak a certain amount of oil and gasoline into lakes and reservoirs. These are just a few of the sources of organic compounds entering water resources.

The problems associated with petroleum in water may be ameliorated over time thorough various natural treatment processes. Among these are evaporation, dissolution, dispersion, adsorption onto suspended particulate matter, sinking, and microbial oxidation.

Another naturally occurring process for treating oil films on water is photocatalytic oxidation (alternatively referred to as photoassisted or photochemical oxidation, or as photooxidation). Since oil and related organic materials generally have a lower density than water, they tend to float on the surface of water as a film, and are thereby exposed to a significant amount of solar illumination. Natural photocatalytic oxidation of floating oil films has been the subject of several studies, and it is generally known that oxidation of organic compounds in oil can be naturally photocatalyzed and that the oxidation products are generally more water soluble and/or less refractory compounds, such as alcohols, ketones, and carboxylic acids. These photooxidation products may be environmentally less harmful, because after dissolving, they tend to be more readily attacked by microorganisms for eventual complete oxidation to $CO_2$.

Techniques for cleaning oil slicks have been tried and are discussed in the literature. For example, mechanical clean-up methods, such as the use of booms, skimmers, and absorbents, have been used. However, these are impractical in many situations.

Chemical techniques have also been tried. For example, dispersants and emulsifiers may be used to accelerate natural dispersing of oil. However, these techniques are environmentally damaging in many situations, as they may simply direct the oil and resulting damage away from the water surface to underlying depths.

Another technique which has been suggested is the use of organic photosensitizers to photocatalyze the oxidation of the oil film. A potential problem with this type of technique is that the wavelengths needed to excite the oil-dissolved photosensitizer are often absorbed by other constituents of the oil film. Furthermore, even if the photosensitizer has been excited by a photon, it may be "quenched", i.e. transfer energy to another dissolved compound that is not an adequate photosensitizer. Therefore, this technique has not been widely accepted.

Thus, there is a continuing need for environmentally safe and beneficial methods for treating organic compounds which float on and plague the surface of bodies of water. It is a general object of this invention to provide materials and methods for such treatment which overcome or reduce at least some of the disadvantages of the prior art.

SUMMARY OF THE INVENTION

One broad aspect of the present invention provides a bead having an exterior surface that is at least partially coated with a material that under illumination and in the presence of air is capable of assisting in (i.e. accelerating) the oxidation of organic compounds floating on water, the coated bead being water floatable. The term "bead" is used broadly herein to mean a piece of material having virtually any three-dimensional shape (e.g. spherical, octahedral, prismatic, or of irregular cross-section). The coated beads contemplated by this invention generally have an equivalent diameter of less than about 2 millimeters.

The term "equivalent diameter" is used herein to mean the diameter of a sphere which would have the same volume as the bead. Thus, for example, if the bead has a volume of $pi/6$ $mm^3$, it has an equivalent diameter of 1 mm.

The term "water floatable" means that the coated bead has such physical characteristics that it will float at or near the surface of water either indefinitely (e.g. until washed ashore or dissolved, or for a sufficient period of time such that the material coated on the bead may be effective to assist in, induce or accelerate oxidation of organic compounds floating on the water under sunlight. The coated bead may be made floatable in at least three ways. First, the coated bead may have a density less than the density of water. Second, the coated bead may be treated such that it is substantially hydrophobic (i.e. oleophilic), and therefore be kept by interfacial forces on the film near the water surface. Finally, the coated bead may be made sufficiently small for the sedimentation velocity to be substantially reduced, particularly in viscous oils. By making coated beads of such small dimension, their precipitation time through an oil film may be long enough such that they are in contact with the oil film for a sufficient length of time to effect photooxidation thereof. For example, the coated bead size could be small enough such that the sedimentation velocity would be on the order of $10^{-6}$ centimeters per second, thereby making their precipitation time through a typical oil film longer than about 24 hours.

Preferably, when used to treat oil slicks on the surface of an ocean or sea, the coated beads provided by this invention have a density less than the density of sea water. The coated beads will therefore tend to float along with the oil slick on the surface of the sea water. More generally, the coated beads preferably have a density less than the density of the water onto which they are to be dispersed.

Preferably, the bead has a relatively high index of refraction, and the coating material has an even higher index of refraction. In this way, the bead may tend to trap and waveguide light to the photocatalytic coating material. This is desirable, since generally the more light that reaches the photocatalytic coating material, the greater the photon flux for photoassisted oxidation of the oil by oxygen.

Specifically, it is preferred that the photocatalytic coating material have an index of refraction of at least about 2. Examples of such materials are zinc oxide (n=about 2), zinc sulfide (n=about 2.3), titanium dioxide (n=about 2.8), and iron oxide (n=about 2.9). It is preferred that the bead have an index of refraction of at least about 1.5 (as is typical of most $SiO_2$—based glasses or 1.6 (as is typical of most ceramics).

The term "index of refraction" as used herein is that measured at the sodium D-line near 589 nm. In the context of a hollow bead as used in certain embodiments of this invention, the index of refraction refers to the bead shell material only, and not the hollow (air) interior.

The coating material preferably comprises an n-type semiconductor having a band gap of at least about 2 eV. The coating material is also preferably photoconductive. Specific compounds which may be used alone or in combination as the coating material include titanium dioxide, zinc oxide, zinc sulfide, and iron oxide. Other compounds may be effective as photocatalysts, but may be less preferable either because of their toxicity, or because of their photodecomposition (i.e. photooxidation of their surface or photodissolution).

Preferably, the beads comprise an inorganic material, which generally may be coated readily with photocatalytic compounds. For example, hollow glass or hollow ceramic beads may be used.

Alternatively, the bead may comprise an organic material. However, since a photocatalytic coating material may tend to photocatalyze the oxidation of an organic bead material by oxygen, the bead preferably should be protected with an intermediate layer comprising a material which will not allow oxidization of the organic bead material or itself be oxidized by oxygen in a process photocatalyzed by the outer coating material. The organic bead material may be, for example, a plastic material such as polyethylene or polypropylene. The protective intermediate layer may be, for example, silicon dioxide or aluminum oxide.

In general, the smaller the coated bead provided by this invention, the more economical it will be in use. In any event, the size of each coated bead is preferably less than the thickness of the oil film to be treated.

In order to take advantage of the optical properties of the coated beads and their ability to trap light, the lower limit on the equivalent diameter of the coated beads is on the order of about one tenth of the wavelength of light. This is so because if the beads are smaller, their dielectric properties (including their index of refraction) tend to be averaged with those of the medium in which they are immersed, and light of appropriate wavelengths (e.g. longer than 200 nm) will not be substantially refracted or reflected at the particle-liquid interface. In order to optically guide and trap light, coated beads with an equivalent diameter of at least about 30–100 nm are thus preferred.

Preferably, the coated beds provided by this invention have an equivalent diameter of less than about 200 microns, more preferably less than about 100 microns, and most preferably between about 10 and 30 microns, but have at least a 30 nm equivalent diameter.

In certain embodiments, the invention provides coated beads which are oil dispersible and water floatable and capable of accelerating the oxidation of hydrocarbons in the presence of oxygen and light. The term "oil dispersible" as used herein means that the coated beads are capable of being dispersed in or on oil. That is, they may have a surface that makes them wetted by oil.

In another broad aspect, the present invention provides a method for treating an oil film floating on a body of water using the coated beads described above. The method comprises the steps of dispersing a plurality of such coated beads on an oil film, and allowing the coated beads to be exposed to solar illumination and ambient air, thereby accelerating the oxidation of organic compounds in the oil film. Preferably, the coated beads have an average equivalent diameter less than the average thickness of the oil film, and the coated beads float at or near the surface of the oil film. In certain embodiments, light may be trapped by the beads and waveguided to the coating material.

In another broad aspect, the present invention provides a method for treating an oil film floating on a body of water comprising the steps of dispersing a plurality of water floatable particles on oil film, the particles comprising a material that under illumination and in the presence of air is capable of oxidizing organic compounds in the oil film. The particles are allowed to be exposed to solar illumination and ambient air, thereby accelerating the oxidation of organic compounds in the oil film.

The term "particle" is intended to mean any form of solid particulate matter, but is not intended to include individual dissolved molecules. Specifically, the term particle as used herein includes particulates having on the order of at least 5 nm physical dimension.

Preferably, the particle material comprises an inorganic material, such as an n-type semiconductor having a band gap of at least about 2 eV. The particle material is also preferably photoconductive. Appropriate materials for use in this method include titanium dioxide, zinc oxide, zinc sulfide, and iron oxide.

In another embodiment of the invention, the beads may be made to aggregate organic compounds. In this embodiment the beads do not disperse on an oil layer, but instead form floating clumps made up of bead-oil matrices.

In another embodiment of the invention, the beads may be used in conjunction with microbes that biodegrade organic compounds. Thus oil may be partially photooxidized by the beads, and then microbes may be used to complete the oxidation to carbon dioxide and other less harmful products.

In another embodiment of the invention, the bead surface is optimized to a have a specified amount of coverage by a catalyst. In this manner optimum photooillumination properties may be achieved without use of excess catalyst.

In another embodiment of the invention, the bead will preferably float on the surface of oil. In this embodiment the percent of the bead surface area above of the oil-air interface has been optimized. Thus bead densities may be tailored for certain oil densities to achieve the optimum bead surface area above the oil-air interface, and thereby achieve optimum photocatalytic effect.

In another embodiment of the invention, the beads are coated with a catalyst, and a small amount of palladium. The palladium has been found to synergistically work in conjunction with other less expensive catalysts to achieve enhanced photocatalytic effects.

BRIEF DESCRIPTION OF THE DRAWINGS

FIGS. 23-27 show the transfer current as a function of time for vitreous carbon electrodes using various catalysts at various conditions.

FIG. 28 shows the effect of palladium incorporation in the titanium crystallites on the rate of HCl generation through the photoassisted oxidation of sodium 2,2'-dichloropropionate in water.

DETAILED DESCRIPTION OF PREFERRED EMBODIMENTS

Various embodiments of this invention provide environmentally safe technology for treating crude oil slicks resulting from oil spills, in the form of coated beads or particles designed to float with and photoassist in (i.e. photocatalyze) the oxidation of oil slicks when exposed to sunlight and oxygen dissolved in oil, dissolved in water, or in air. The beads may be used by themselves or with microbes. The beads may be capable of spreading on oil slicks to photocatalyze the oil, or the beads may be capable of forming floating matrixes in which oil is aggregated in the matrix and then photocatalyzed. Each of the embodiments will be discussed below.

EMBODIMENT 1—MICROBEADS THAT ARE SPREAD ON OIL

In a preferred embodiment, the beads consist of hollow glass or ceramic microspheres of about 10-30 microns diameter. Beads of this type are manufactured and are commercially available. Their density is about 0.4 g/cm$^3$ for glass beads and about 0.7-0.8 g/cm$^3$ for ceramic beads. Microbeads of 10-30 microns diameter are nearly invisible to the human eye, and thus not an eyesore. Larger microbeads could alternatively be used and would typically have the appearance of white sand.

Figure 1:
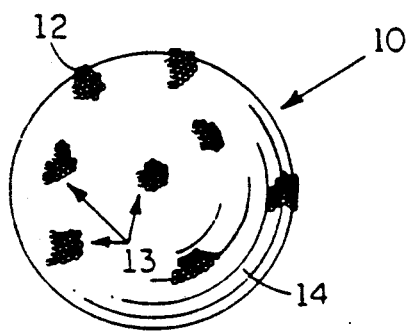
FIG. 1 is an exterior view of a partially coated bead as provided by a preferred embodiment of the present invention.
Figure 2:
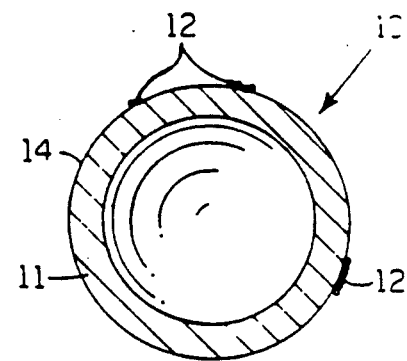
FIG. 2 is a sectional view of the coated bead shown in FIG. 1.

FIGS. 1 and 2 illustrate a preferred coated bead 10 for use in this invention. Each hollow bead 11 may be coated at random sites with a photocatalytic coating material 12, resulting in a bead with coated areas 13 and uncoated areas 14. The bead may alternatively be fully coated, but is preferably only partially coated so as to save on coating material. In this case, sunlight may enter the coated bead 10 through exposed areas 14 and may be waveguided to the coating material 12, as described in more detail below. The term "oxidation material" is defined to mean a material that will enhance or catalyze oxidation reactions.

Figure 3:
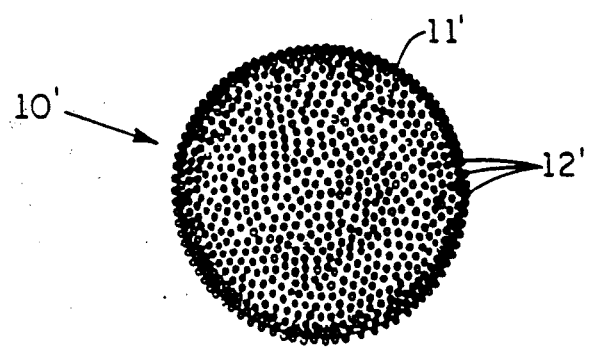
FIG. 3 is an exterior view of another partially coated bead as provided by this invention.

In an alternative embodiment as illustrated in FIG. 3, the coating material 12' may be dispersed relatively uniformly on the bead 11'.

In a preferred embodiment, the coating material 12 comprises $TiO_2$ pigment particles having diameter on the order of 30-200 nm. $TiO_2$ (rutile) or $TiO_2$ (anatase) are particularly preferred for use in this invention, as they are widely used white pigments, and are well known as photocatalysts in the oxidation of contacting organic compounds. Both are substantially nontoxic and environmentally harmless. Both are n-type semiconductors with 3 eV and 3.3 eV band gaps, respectively. The high index of refraction (n=2.8) that makes $TiO_2$ (rutile) an excellent light scatterer also makes it a good collector of photons in the present system.

There is a great amount of literature on photoassisted (i.e. photocatalytic) oxidations with $TiO_2$. It has been theorized that absorption of a photon by $TiO_2$ produces an electron-hole pair. The photogenerated holes oxidize directly contacting organic compounds. The electrons reduce oxygen to a surface-bound peroxide, that also photooxidizes organic compounds. (It should be appreciated that any proposed theory presented herein is for illustrative purposes only, and the claims and disclosure should not be construed as being bound thereto).

Preferably, the coated bead 10 is engineered to have a density of around 0.4-0.9 g/cm$^3$, and the regions 14 of the bead that are not n-TiO$_2$ particle coated are made hydrophobic (i.e. oleophilic). In use, such coated beads will tend to be attracted to and float with an oil layer.

The coated beads may be prepared by starting with commercial hollow glass or ceramic microspheres and depositing on their surfaces a semiconducting photocatalyst by a gas phase process. For example, the surface of the beads may be prepared in a fluidizing bed arrangement by flowing through a stream of dry nitrogen that contains a surface di- or trialkoxy (or chloro) silane. Subsequently, a gaseous dispersion of TiO$_2$ pigment particles may be passed through the bed of activated microspheres. The term "oxidation material" includes semiconductor materials. In one embodiment of the invention the beads may be covered with a semiconductor at least partially coated with palladium.

Alternatively, the surface of the ceramic beads may be coated by a smoke of partially hydrolyzed, reactive titanium tetrachloride (TiCl$_4$) or tetraalkoxide(-Ti(OR)$_4$).

Simple and inexpensive methods exist for making SiO$_2$ (glass) hydrophobic (i.e. oleophilic) and thus obtain an oil-wetted coating on the bead, such as exposure to trimethyl chlorosilane vapor (e.g. a dry air-stream with trimethyl chlorosilane). Only one monolayer is typically needed to make the surface hydrophobic. Thus, the partially coated bead 10 may be exposed to such a material to render it substantially hydrophobic. Although the resulting hydrophobic organic monolayers may be photooxidized on the bead areas 13 coated with n-TiO$_2$ particles 12, they will remain on the uncoated glass or ceramic surface 14. Alternatively, the bead 11 surface may first be made hydrophobic, and subsequently partially coated with photocatalytic material 12.

Figure 4:
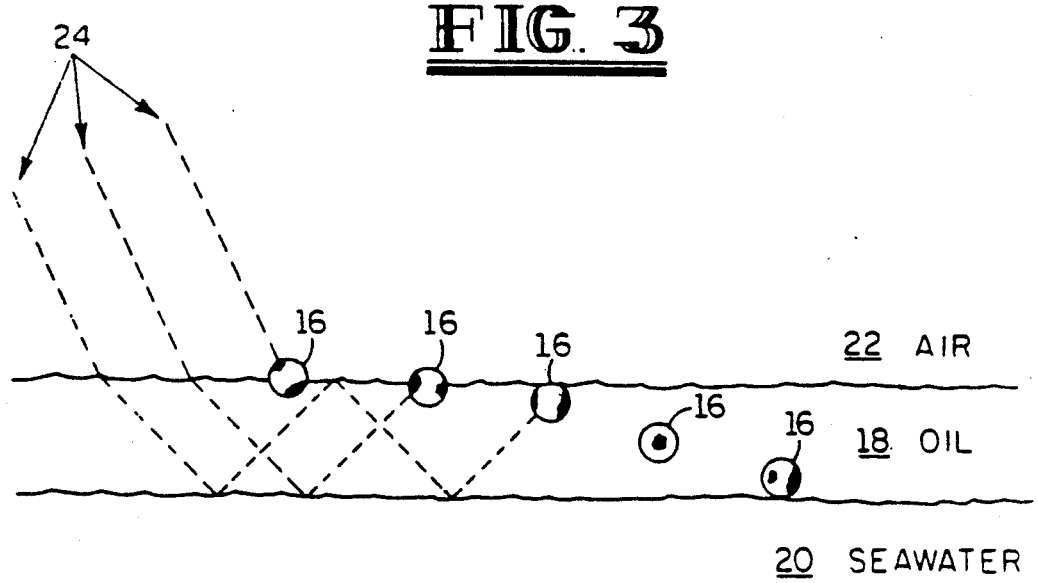
FIG. 4 is a schematic drawing showing coated beads dispersed in an oil film floating on water, as provided by preferred methods of practicing this invention.

As illustrated in FIG. 4, a plurality of water floatable, partially coated beads 16 may be dispersed within an oil film 18 on water 20. The beads 16 may be of varying density and degree of hydrophicity, and thus reside at differing depths of the oil film 18, as shown in FIG. 4. The diameter of the beads 16 is preferably less than the thickness of the oil film 18.

Typically, an oil film (n=about 1.45) is bounded by two media with lower refractive index, i.e. air (n=1.00) and seawater (n=about 1.34). Because of this, attenuated total reflection of incident sunlight may occur, causing part of the light to propagate in the oil film. The critical trapping angles at the air-oil and oil-water interfaces to achieve such propagation are typically about around 46° and 72°, respectively.

This phenomenon may be used advantageously in the practice of this invention. Referring again to FIG. 4, the coated beads being preferably made of glass or ceramic, have an index of refraction at some or all of their surface of approximately 1.5 or more, which is above that of seawater and oil. Thus, incident sunlight (represented as dashed lines 24) may be partially trapped initially in the oil film 18, and then in the higher index coated beads 16 by total internal reflection of the light.

Because the index of refraction of TiO$_2$ (rutile) is about 2.8 (well above the index of the glass or ceramic), the light may be waveguided to the TiO$_2$ coating particles. By analogy, the effect may be similar to a high index dust particle (analogous to the TiO$_2$ on the bead) on an optical fiber (analogous to the oil film) carrying a laser beam (analogous to the reflected sunlight).

As a result, both direct and reflected light can reach the photocatalytic coating material on the coated beads 16. Photons of less than 3 eV energy, absorbed by the particles, can produce a flux of oxidizing holes and peroxide forming electrons, thereby accelerating oxidation or organic compounds in the oil film 18.

In typical applications, some of the trapped light may be lost by absorption in the oil. In light crudes that are nearly colorless, there may be little attenuation. Nevertheless, even in typical heavy crudes, which at 337 nm may have extinction coefficient near 20 cm$^{-1}$, much of the light trapped in the oil film may end up in the high refractive index TiO$_2$-coated microbead.

The actual solar radiation collecting area per microbead will typically depend on the extinction coefficient through the 300–400 nm range. Even for highly absorbing oils, the effective collection area per microbead may be greater than approximately 0.01 cm$^2$, considerably larger than the actual bead surface area of the smaller beads of this invention.

In typical cases, the initial photooxidation products will be slightly water soluble alcohols, ketones, and carboxylic acids. Though not proven to be safe to sealife, these products can be highly diluted as they can dissolve in seawater. Also, the photooxidation products may be far more rapidly attacked by microorganisms (that eventually oxidize them to CO$_2$) than the hydrocarbons of a slick.

In the following discussion, a conservative estimate of oil slick removal rates is presented, based only on the bead surface area, without assuming any waveguiding in the films. The average daylight solar irradiance, at all wavelengths is, in the midlatitudes, approximately 700 W/m$^2$. About 1.5% of the solar flux can produce an electron-hole pair in TiO$_2$—that is, exceeds the 3.0 eV band-gap of this semiconductor. Thus, the useful flux is approximately 10 w/m$^2$ For a 3 eV semiconductor, this represents an electron or hole current density of 3.3 A/m$^3$. When holes directly oxidize the oil, and when electrons reduce O$_2$ to a (TiO$_2$ surface-bound) oxidizing peroxide, two equivalents of oxidizer are produced per photon absorbed. Thus, if a hydrocarbon is solubilized by a two-electron oxidation reaction (e.g. is converted to an alcohol), the solar flux limited rate of oil stripping is about $3.2 \times 10^{-5}$ moles/m$^2$sec or approximately 1.4 moles/m$^2$ day (1 day-12 h.). If 4 or 6 electron-oxidation reactions are required to dissolve the oil, the corresponding values are approximately 0.7 and 0.5 moles/m$^2$, respectively. 0.7 moles/m$^2$day translates for the hydrocarbon dodecane (MW 170) to approximately 120 g/m$^2$day, equivalent to $8 \times 10^{-4}$ barrels/m$^2$day, i.e. to elimination of an oil film of 0.1 mm thickness over the 1 m$^2$ area in one day. Assuming that the hydrophobic particles float and stay with the oil slick until it is destroyed, and that their actual activity is only 0.2 of theoretical, 1 m$^2$ of the microbeads will eliminate in one month $5 \times 10^{-3}$ barrels of oil. Since the diameter of the preferred beads is approximately 10–30 microns, about 6 g of material will cover 1 m$^2$ of area (this is a conservative estimate, since each microbead may actually collect light from an area that is 10-100 times its own, even in a heavy, strongly absorbing crude, because of the waveguiding properties of the oil film). At a cost of $1/lb, the materials cost is approximately 1.3¢/m$^2$ The corresponding materials cost for cleaning up 1 barrel of oil in one month is thus less than $2.60.

In an ocean clean-up, coated microbeads provided by this invention may be carried in and dispersed from bulk grain or fertilizer carrying ships, then dispersed on the ocean surface with the oil, by wind and waves. Because the coated beads are preferably hydrophobic and because their density can be adjusted to be somewhat less than that of crude oil, they can follow the slicks, floating near their surface. Their transportation and dispersion costs should be similar to those for bulk free-flowing fertilizers.

It should be appreciated that in the preferred embodiments described above, the materials used for the beads and bead coatings are substantially safe to ingest, and thus will not significantly harm humans, fish, birds or vegetation.

EXAMPLE 1—DODECANE AND HEXADECANE PHOTOCATALYZATION

The following example is designed to illustrate certain aspects of the present invention. The example is not intended to be comprehensive of all features and all embodiments of the present invention, and should not be construed as limiting the claims presented herein.

Experiments were carried out relating to photocatalytic oxidation of films of dodecane and hexadecane on distilled water by oxygen. Quartz boats were used with a free liquid surface area in the boats of ca. 20 cm$^2$. A filtered medium pressure Hg light source with wavelengths shorter than ca. 2900 angstroms was used for illumination. The irradiance was estimated to around 8 mW/cm$^2$ on the liquid surface. The photocatalyst was n-TiO$_2$ (from Dagusa, FRG, No. P25) in the form of ca. 30 nm diameter particles.

Experiments were conducted by placing in each boat ca. 50 cc. distilled water and ca. 0.5-1 cc. of oil to form the oil films. Usually, 10-100 mg of n-TiO$_2$ particles were scattered on the surface of the oil film prior to irradiation. The boats with water, oil and photocatalyst were placed under the UV light source and allowed to remain for periods from 12-72 hours. Residual oil remaining was determined by pouring the contents of each boat into a burette. This procedure had been determined to yield adequate accuracy in a number of tests on known oil volumes.

In one series of runs using hexadecane as the oil, illumination by the UV light source of a first boat with water, hexadecane oil films and n-TiO$_2$ photocatalyst was carried out for ca. 65 hours. A second boat containing identical amounts of water, hexadecane but no n-TiO$_2$ was also exposed to the UV illumination. A third boat containing water, hexadecane, and n-TiO$_2$ photocatalyst was prepared to the same amounts as in the first boat, but not exposed to UV illumination. The first boat was illuminated for ca. 65 hours and was then removed from illumination. The pH of the water phase was determined to be ca. 4.1. The pH of water in the second and third boats was ca. 7.0, characteristic of distilled water used in the experiments. The oil phase from the three boats was subjected to GC-MS (gas chromatographic-mass spectrometry) using chemi-ionization. The analysis showed that the first boat yielded an oil with a composition of: $C_{10}H_{16}O_4$, $C_{12}H_{24}O$, $C_{13}H_{28}$, $C_{16}H_{34}$, $C_{16}H_{32}O_2$, plus other undetermined species. (Results are somewhat uncertain as chemi-ionization was used in MS, but library was for eii). This together with the pH reading of 4.1 shows that the n-TiO$_2$ photocatalyst was effective in oxidizing the oil film in the presence of UV light.

EXAMPLE 2—PREPARATION OF BEADS WITH WATER

In an alternate embodiment of the invention, the beads may be prepared with mixed TiO$_2$ from several sources, as discussed below.

A mixture of TiO$_2$ was prepared as follows: about 0.64 g of Degussa Corporation brand P25 TiO$_2$ was mixed with about 2.56 g Hombitan brand TiO$_2$ (Sachtlebenchemie GMBH, Duisburg-Homberg, Germany) and 1.68 g SLG (pQ Corporation) brand beads. The SLG brand beads are alumino silicate beads. In this mixture the total TiO$_2$ weight percent was about 16 %, of which about 3.2% was the Degussa P25 TiO$_2$, and about 12.8% Was the Hombitan TiO$_2$. The Degussa TiO$_2$ tended to be smaller than the Hombitan. Thus the Degussa was used to "cement" Hombitan to the beads, since the Hombitan was more difficult to adhere to the beads. In this manner the larger Hombitan crystals were attached to the beads, which tended to improve the amount of TiO$_2$ on the bead surface. In practice, the Degussa and Hombitan was generally mixed together first, and then the beads were carefully added.

After preparing the TiO$_2$ mixture, as small amount as possible of nano(i.e., deionized) water was added to make a thick 10 slurry. The mixture was then stirred gently and sonicated for about 5 minutes. The sonicating bath was a vibrating bath which operated at high frequency to enhance mixing, as is well known in the art.

The mixture was then dried in the oven at 120° for about 1 hr. After drying the remaining beads were calcined (in an ambient atmosphere) in a furnace at about 750° C. for about 1 hour. The beads were then cooled.

After cooling, the beads were contacted (etched) with boiling 0.1 M HCl for about 10 min. The beads were then washed in nano water in a microanalysis separator (i.e., usually a funnel or highly porous filter paper). The beads were then dried in a oven at about 110° C. It is estimated that about 8.3 weight percent of the resulting beads was TiO$_2$.

The beads of the invention may be made so that they include a nonporous shell onto which the coating material may be coated. The shell may be non-gas permeable, and may enclose a gas-filled or evacuated core.

EMBODIMENT 2—MICROBEADS THAT AGGREGATE OIL

In an alternate embodiment, floatable beads or particles may be made so that they do not tend to disperse or float with the oil individually. Instead these beads or particles are capable of forming matrices which aggregate the oil.

It is believed that the beads that aggregate have surfaces modified with oleophilic 3-dimensional matrices of 100 to 5000 Angstrom thickness. When the beads are contacted with oil, the oil is soaked into the matrices and the oil in the matrices may stick to itself, thereby causing the beads to stick to each other, and to other beads coated with oil.

It is also possible that the beads may form pores between the beads because, among other possible reasons, the beads are made with an enhanced oleophilic surface. Thus when the beads are contacted with oil, it is believed that the enhanced oleophilic surface causes the beads to stick to the oil, and each other (the beads tend to be attracted to other beads that are coated with oil). In this manner pores may be formed between the beads.

The matrices are then believed to aggregate oil due to capillary forces acting on the oil when the oil is contacted with the matrices.

In addition to forming pores between beads, it is also possible that the surface of the beads has been modified such that the beads may form oleogel structures which enhance attraction of the oil.

Thus one embodiment of the invention includes water floatable beads that have an equivalent diameter of less than about 2 mm, wherein the beads have an exterior surface which is at least partially coated with a material that under illumination and in the presence of air is capable of accelerating the oxidation of organic compounds floating on water, and wherein the beads are capable of aggregating organic compounds during use. The beads may be at least partially coated with an organosilicate network. This network may include a series of organosilicon oxide crosslinking.

It is believed that one feature of the beads that may enable them to aggregate oil is highly oleophilic nature of the coating on the beads. This oleophilic coating is provided by alkyl groups (e.g., methyl groups) bonded to crosslinked silicon atoms on the surface of the beads. The highly oleophilic nature of the beads may be quantified in that the beads are capable of forming less than a fifteen degree contact angle, as defined by the Young equation, when contacted with a substantially water-insoluble organic compound. Preferably, the beads are capable of forming approximately a 0–10 degree contact angle, more preferably a 0–5 degree contact angle, and more preferably still a 0–2 degree contact angle, as defined by the Young equation, when contacted with a substantially water-insoluble organic compound.

The beads of the invention are believed to be covered by a crosslinked network which creates small discontinuities on the bead surface. These discontinuities are believed to contribute to the aggregation of the organic compounds via capillary action. These discontinuities may include pores or crevasses, however these pores are believed to be much smaller than pores that are created on glass by standard procedures. The pores in the discontinuities of the present invention are believed to be about 10–100 Angstroms in size.

The beads of the invention are capable of aggregating substantial amounts of organic compounds. For instance, preferably about 0.5 to 2.0 grams of beads are capable of aggregating about 1.0 gram of organic compound. It has been found that the beads may aggregate at least about 50 percent of their weight of oil in less than about five minutes.

The beads of the invention may be capable of spontaneously aggregating oil or other non-crystalline organic compounds. The beads of the invention may be used for extracting organic compounds mixed in water (i.e., not just on the surface) by dispersing the beads in the water, preferably with stirring. The aggregation beads of the invention may aggregate organic compounds in the water and then float to the surface, thereby removing organic compounds from the water.

The surface of the beads may be preferentially coated with certain percentages of the coating material (see collection optics discussion below). Preferably approximately 20–100 percent, more preferably 40–80 percent, and more preferably still 50–70 percent of the exterior surface of each bead is coated with the coating material. Too little of surface coverage tends to decrease the efficacy of the beads because too little of the coating material is present. Too much catalyst on the surface may increase the cost of the beads, without substantially increasing bead efficacy.

Similarly, it has been found that an optimal amount of the bead may be exposed to the air at the bead-air interface (see collection optics discussion below). In this manner, light utilization, refraction and reflection within the bead may be optimized. Preferably, approximately 45–90 percent, more preferably 50–75 percent, of the exterior surface of each bead is exposed to air when the beads are floated on organic compounds during use.

The organic compounds, once aggregated, tend to form matrices that may be left in the water to photooxidize by exposure to additional solar illumination and ambient air. These matrices (i.e., oil-bead clumps) may be collected (to prevent dispersal) by booms in the water. These matrices may then be left in the water to photooxidize, or they may be collected and brought on ships or land, and then exposed to solar illumination and ambient air. Alternately, oil-bead matrices may be allowed to wash ashore, and then photooxidize on land.

In addition to aggregation, the beads may be used with a microbe that is capable of biodegrading at least one organic compound in the oil film (see microbe discussion below).

The aggregation beads may be made by mixing an organosilicate with the beads; adding the coating material to the mixture; and then heating the mixture. Less than a stoichiometric amount of water (preferably about 0.3 to less than 1.0, more preferably about 0.4–0.6) may be added to the organosilicate before mixing with the beads.

Preferably the organosilicate and water mixture is heated and refluxed before mixing with the beads. In addition, the organosilicate and bead mixture may be heated and refluxed before adding the coating material.

The organosilicate used above may be a composition which includes a compound or compounds according to the formula:

wherein R is an alkyl, alkoxy, hydroxide, or hydrogen group, and wherein the average ratio of alkyl groups to silicon groups in the composition is greater than or equal to one, and less than two, and wherein the average ratio of alkoxy groups to silicon groups in the composition is greater than two, and less than or equal to three. Preferably the alkyl groups are methyl groups, and the alkoxy groups are methoxy groups. Preferably the organosilicate include methyltrimethoxysilane. The organosilicate may also be a mixture of any or all of methyltrimethoxysilane, tetramethoxysilane, or dimethyldimethoxysilane. Once crosslinked, it is believed that the bead surface includes an oleogel network of Si-O-Si bonds, where each Si has an alkyl group (e.g., a methyl group) also bonded to it.

EXAMPLE 3—PREPARATION OF BEADS THAT AGGREGATE OIL

One method of preparing beads that aggregate oil included the following steps:
 (1) About 750 milliliters ("ml") of pure 100% ethanol was added to a three-neck 2000 ml reaction flask.

About 100 ml of methyltrimethoxysilane (CH3Si(OCH3)3, hereinafter abbreviated as "MTMOS") was then added to the reaction flask. About 8 ml water was then added to the reaction flask at a desired pH (typically the water added had a pH of >3.0).

(2) The contents of the reaction flask was boiled and refluxed at about 78° C. for about 4 hours.

(3) About 250 grams ("g") of dried SLG brand (PQ Corporation, Valley Forge, Pa., U.S.A.) glass beads were then slowly and carefully added to the flask. The beads had been previously water washed to remove impurities. The mixture was refluxed for about 2 hours.

(4) 100 g of dried Degussa P-25 TiO$_2$ (Degussa Corp., North Dublin, Ohio, U.S.A.) was then added slowly and carefully to the flask. Degussa P-25 is believed to be a mixture of approximately one-third rutile and approximately two-thirds anatase. The mixture was then refluxed for about 2 hours.

(5) The mixture was cooled and transferred to a large beaker (capacity=1,500 ml). The ethanol and unpolymerized MTMOS was evaporated at 110° C. for approximately 12 hours.

(6) The dried mixture was gently loosened under a hood and the loosened contents was sieved to obtain bead aggregates less than about 0.5 millimeters ("mm") in diameter.

(7) The beads were then heated in an oven at about 200° C., and then water washed until a clear solution obtained. The beads were then etched once in dilute 0.1 Molar HCl. The beads were then washed in a 2,000 ml separatory funnel 10-20 times with 750-1000 ml nano water. When the water in the funnel remained clear, the beads were then again etched in dilute HCl and then rewashed with nanopure water about 3-5 times.

(8) The beads are then filtered and dried in an oven at about 110° C. for about 12 hours.

Beads prepared by the above procedure tended to have at least a 2-3% quantum efficiency (i.e., percent of photons that photoinduce a reaction) in the conversion of 3-octanol to 3-octanone. This quantum efficiency may be roughly doubled if the beads are slightly reduced (i.e., placed in a hydrogen stream at about 450° C. for about 1 hour and 15 minutes). As discussed below, the activity may be further enhanced if the TiO$_2$ is then coated with a small amount of palladium.

It is believed that the bonding of TiO$_2$ particles to the SLG beads using methyltrimethoxy silane as a coupling agent is a three step process, as discussed below. The reactions are carried out in a batch reactor held at about 78° C. (which is the approximate boiling point of the solvent). The first step involves the partial polymerization reaction of methoxy units to primarily, chains of a polysiloxene gel. A substoichiometric amount of water is added that, at an acidic pH, polymerizes the MTMOS into a sol network still having reactive methoxy groups. Only a small amount of the MTMOS monomer is actually polymerized.

The stoichiometry of the reaction ma be:

$$CH_3\,Si(OCH_3)_3 + 1.5H_2O \rightarrow CH_3SiO_{1.5} + 3CH_3OH$$

The amount of water which is added is half of that required for the above stoichiometry. Thus resulting sol retains some reactive methoxy groups.

Half Stoichiometric Reaction:

$$CH_3\,Si(OCH_3)_3 + 0.75H_2O \rightarrow CH_3\,Si(OCH_3)_{0.75}O_{0.75} + 1.5CH_3OH$$

The SLG microspheres are then added to the solution. The surface pH of the beads is about 5.8, the pH of the solvent is about 3-3.5. Moisture on the bead surface may cause the sol in the solution to react with the bead surface. The surface thus becomes covered with the partially polymerized sol.

Ethanol was used as a solvent. Other solvents could be used such as alkanes (e.g., hexane). Ethanol was chosen because of its low cost and toxicity. It is believed to be important that an excessive amount of water is not added to the reaction. Otherwise, the reaction may progress to complete polymerization. In other words, a small amount of water may partially crosslink the MTMOS, but not totally react or polymerize the MTMOS. Thus available methoxy groups for further reaction may remain after the water is added, as discussed above.

Titanium dioxide particles are added to the silica sol SLG/solvent solution. The pH of the titania, Degussa P-25, is about 4.2. The hydrated TiO$_2$ particle surface may then be reacted with unreacted methoxy groups. During this last step the TiO$_2$ particles begin to bond to the bead through reaction of the remaining methoxy groups in the sol layer with the TiO$_2$ surface.

In addition to the above, it is believed that the pH of the bead may affect attachment of TiO$_2$ and MTMOS to the bead.

The solution is finally filtered, and allowed to dry and cure. During the drying process, the TiO$_2$ particles are bonded to the SLG (PQ Corporation) bead. The procedure results in bonding to the surface of the SLG beads of a matrix containing photoactive titania. The surface of the matrix is made oleophilic by the polymer's alkyl units. The excess TiO$_2$ is removed by repeated washing in water and one wash in dilute HCl.

Beads prepared by this procedure have a titania ("TiO$_2$") loading of 5 to 15+wt % TiO$_2$, depending on the amounts of the reagents and titania used. The coating is stable under uv exposure for several weeks, and the beads are photoactive in the conversion of 3-octanol to 3-octanone. Primary quantum efficiencies are TiO$_2$ loading dependent and are typically of 1-4.5%.

Surface area of the beads prior to their modification is about 0.1 ml per gram. The above method causes the area of the beads to be about 6 m$^2$ per gram. This surface area was measured by BET nitrogen adsorption. The surface area tends to increase as the amount of TiO$_2$ increases.

It is possible that other oleophic network forming organics may be used.

The beads of the invention may include a hermetically sealed glass enclosed bubble that may be evacuated or contain a gas. Generally, at least one surface of the beads is substantially smooth, and thus the beads are substantially nonporous. The smooth surface of the beads is coated with an aleophilic matrix that is 100-5000 Angstroms thick.

EMBODIMENT 3—MICROBEADS WITH MICROBES

In an alternate embodiment of the invention, the microbeads may be used with microbes to enhance oxidation and/or biodegradation of organic compounds. Many of these microbes are well known in the art, and the following is a brief discussion of some of these microbes.

Hydrocarbon degradation by microbe communities usually depends on the composition of the community and its adaptive response to the presence of hydrocarbons. Bacteria and fungi are agents of degradation, with bacteria tending to assume the dominant role in marine ecosystems and fungi becoming more important in freshwater and terrestrial environments. Adapted communities, i.e., those which have been previously exposed to hydrocarbons, exhibit higher biodegradation rates than communities with no history of hydrocarbon contamination. Individual organisms may metabolize only a limited range of hydrocarbon substrates, so that mixed populations with overall broad enzymatic capacities may be preferred to degrade complex mixtures of hydrocarbons such as crude oil in soil, freshwater, and marine environments.

Preferred hydrocarbon-degrading bacteria in marine environments include Achromobacter, Acinetobacter, Alcaligenes, Arthrobacter, Bacillus, Flavobacterium, Micrococcus, Nocardia, Moraxella, Alteromonas, Pseudomonas and Vibrio species, members of the family Enterobacteriaceae, actinomycetes and coryneforms. Common preferred marine fungal isolates include Aureobasidium, Candida, Rhodotorula, and Sporobolomyces. Other preferred species isolated from marine environments are: Aspergillus, Penicillium, Corollospora, Dendryphiella, Lulworthia and Varicosporina. Table 1 below depicts some genera of preferred hydrocarbon-degrading bacteria and fungi for and from marine and brackish water environments.

Fungi tend to be relatively minor components of the marine microflora, increasing in numbers in nearshore regions, the intertidal zone, and salt marshes and mangrove areas. Fungi are important inhabitants of specialized niches such as submerged wood, the surface film of water, decomposing algae, and the surface of tarballs. A hydrocarbon-degrading fungus, Cladosporium resinae, tends to degrade petroleum if added as an inoculum.

Seeding involves the introduction of allochthonous microbes into the natural environment for the purpose of increasing the rate or extent of biodegradation of pollutants. The criteria to be met by effective seed microbes include the ability to degrade most petroleum components, genetic stability, viability during storage, rapid growth following storage, a high degree of enzymatic activity and growth in the environment, the ability to compete with indigenous microbes, nonpathogenicity, and the inability to produce toxic metabolites. Mixed cultures have been used as inocula for seeding because of the relative ease with which microbes with different and complementary hydrocarbon-degrading capabilities may be isolated. Seed microbes may be chosen from those genera listed in Table 1. In addition, microbial strains have been constructed through genetic manipulation which are able to degrade a variety of different types of hydrocarbons. A multiplasmid-containing Pseudomonas strain capable of oxidizing aliphatic, aromatic, terpenic, and polyaromatic hydrocarbons may be constructed. Such recombinant microbes may be well suited as seeding organisms for the degradation of oil spills.

TABLE 1
MAJOR GENERA OF HYDROCARBONOCLASTIC BACTERIA AND FUNGI FROM MARINE AND BRACKISH WATER ENVIRONMENT

| BACTERIA | FUNGI |
| --- | --- |
| Achromobacter | Allescheria |
| Acinetobacter | Aspergillus |
| Actinomyces | Aureobasidium |
| Aeromonas | Botrytis |
| Alcaligenes | Candida |
| Arthrobacter | Cephalosporium |
| Bacillus | Cladosporium |
| Beneckea | Cunninghamella |
| Brevebacterium | Debaromyces |
| Coryneforms | Fusarium |
| Erwinia | Gonytrichum |
| Flavobacterium | Hansenula |
| Klebsiella | Helminthosporium |
| Lactobacillus | Mucor |
| Leucothrix | Oldiodendrum |
| Moraxella | Paecylomyces |
| Nocardia | Phialophora |
| Peptococcus | Penicillium |
| Pseudomonas | Rhodosporidium |
| Sarcina | Rhodotorula |
| Spherotilus | Saccharomyces |
| Spirillum | Saccharomycopisis |
| Streptomyces | Scopulariopsis |
| Vibrio | Sporobolomyces |
| Xanthomyces | Torulopsis |
| | Trichoderma |
| | Trichosporon |

The various embodiments 1–3 above were modified and tested as discussed in the examples below.

EXAMPLE 4—BEAD REDUCTION

Beads may be reduced to increase the quantum efficiency of their photocatalytic activity. For instance, beads prepared according to Example 2 above were reduced in a stream of H2 (100 cm$^3$ of H2 per minute) at 450° C. for 2.5 hours and cooled down to room temperature under a stream of H$_2$.

EXAMPLE 5—BEADS WITH PALLADIUM

The TiO$_2$ on the beads may be partially coated with palladium to increase the quantum efficiency. One method used to coat the beads is discussed below.

A first solution was prepared by dissolving 0.011 g of PdSO$_4$ in 50 ml of nano water with 3 to 4 drops of concentrated HCl. Five ml of this solution was mixed with 3 g of beads prepared according to Example 2 above, 2.5 ml of glacial acetic acid, and 200 ml of nano water. This mixture was then put under UV radiation (6 mW/cm$^2$) with N$_2$ bubbling through it for about 20 hrs. The beads were then filtered, washed and dried.

EXAMPLE 6—OIL PHOTOOXIDATION AND REVERSE-PHASE CHROMATOGRAPHY

Beads were prepared according to example 2 above and then reduced at 450° C. for 2.5 hours, and then coated with palladium, according to example 6 above, so that about 1.2 weight percent of the beads was palladium.

Reactor vessels were prepared that had a constant flowthrough of oxygen during photooxidation. Various crude oil samples, as outlined below, were illuminated with ultraviolet light for 65 hours. After 65 hours, photooxidation was stopped and the crude oil fractions collected and dissolved in 5 ml of hexane. Components of each sample are given below and were added in the order given.

| Sample 1. | 30 ml nano water |
| | 2.5 ml Basrah light crude oil |
| | 5.0 ml toluene |
| | 2.0 g beads |
| Sample 2. | 30 ml nano water |
| | 2.5 ml Basrah light crude oil |
| | 5.0 ml toluene |
| | 0.0 g beads |

The toluene was added to help spread the heavier crude oil on the water. After photocatalytic oxidation of the samples, they were analyzed using a high performance liquid chromatograph system ("HPLC" system). The procedure for analysis was as follows:

a) A NH2 Sep-Pak cartridge (Waters Chromatography, U.S.A.) was prepared by flushing the cartridge with 5 ml of hexane.
b) One ml of the crude oil sample was mixed with 1 ml of methylene chloride. A 1 ml aliquot of this mixture was slowly loaded onto the NH2 cartridge.
c) The cartridge was washed with 2 ml of a 50% hexane/50% methylene chloride mixture.
d) The sample was eluted using 3 ml of methylene chloride.
e) The cartridge was washed with 2 ml of a 50% methylene chloride/50% isopropyl alcohol mixture.

Each sample was then analyzed using the HPLC system. Each sample was collected separately. All reagents used were HPLC grade.

Figure 5:
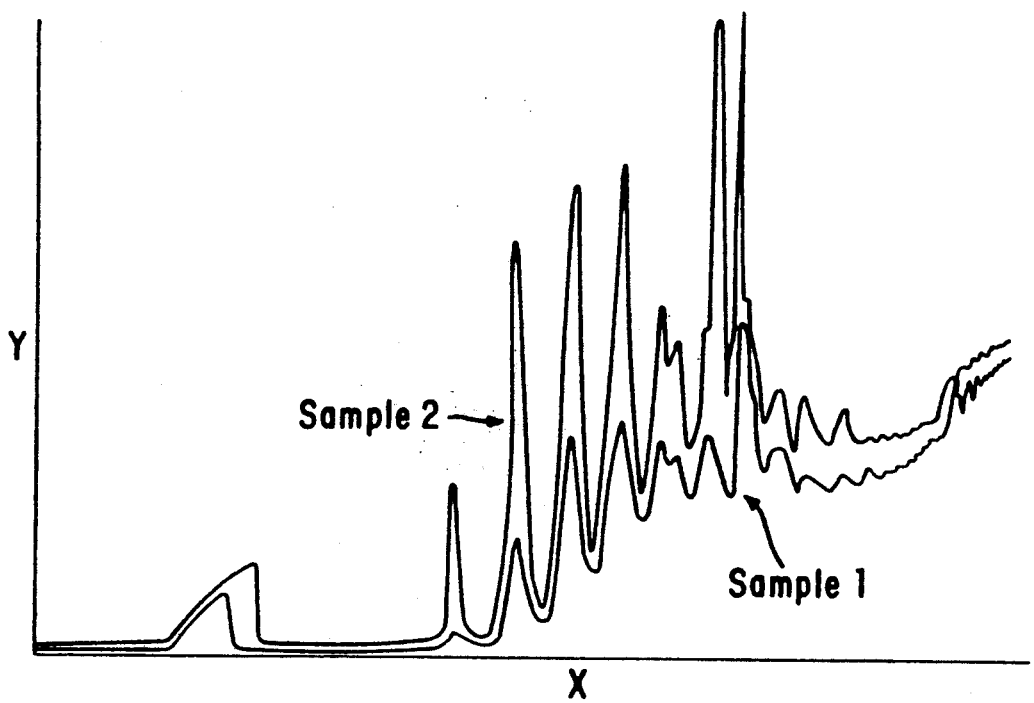
FIGS. 5 and 6 depict chromatograph results for samples of organic compounds that have been treated with certain beads and ultraviolet light.
Figure 6:
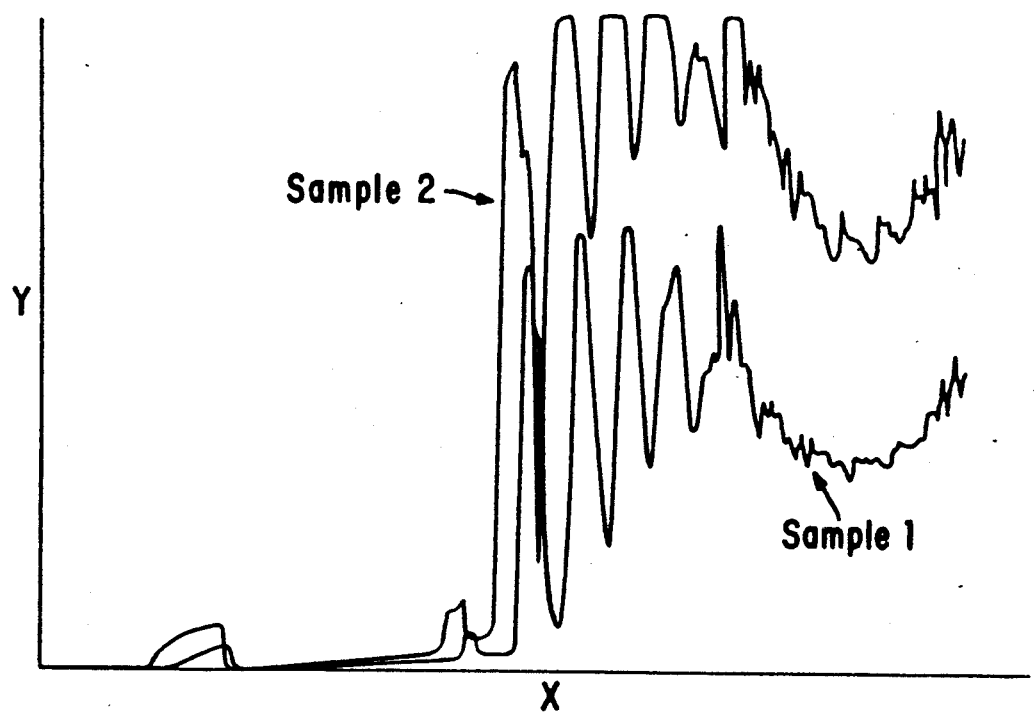

HPLC analysis was performed using a C-18 μBONDAPAK, 3.9mm×300mm column (Waters). A 60 minute linear gradient of 10% to 100% acetonitrile in water at 2 ml per minute was used for the separations. Each fraction was filtered before being injected onto the HPLC. The HPLC grade solvents were filtered and degassed before use. Significant differences were found when comparing chromatograms of the same fraction from sample 1 and 2. These are shown in FIGS. 5 and 6. FIGS. 5 and 6 show quantities of crude oil components eluted from the amino type column. The integrated areas under the curves in FIGS. 5-6 are proportional to the amounts of components. The Y axis of FIGS. 5-6 represents relative amounts of the components. The X axis represents time, in minutes. As shown in FIGS. 5-6, the samples with the beads (samples 1 in FIGS. 5-6) exhibited substantially lower amounts of the crude oil components than the samples that did not have beads in them. Some of the peaks for the samples with beads were different than the peaks for the samples without beads, indicating that photooxidation is breaking the crude oil samples into different compounds. In addition, it is evident that photocatalytic oxidation converts the primarily non-polar components of the oil to polar that are not eluted from the adsorption column.

FIGS. 5-6 show that 50-80% of the various organic compounds was oxidized.

EXAMPLE 7—PHOTOOXIDATION WITH AND WITHOUT MICROBES

Different systems selected for the study are shown in Table 2. The term "beads" means beads without a coating material were added to the sample. The term "beads/catalyst" means beads prepared according to Example 2 were added to the sample. The term "MTMOS beads" means beads prepared according to Example 3 were added to the sample. The components of the systems were placed in the covered crystallization dishes in the following sequence.

| | |
|---|---|
| Water with fertilizer | 200 ml in each sample. The water with fertilizer is made by dropping 7 drops of "Schultz-Instant" plant food in 1 liter of nano water. The plant food is believed to include nitrogen, phosphorous, and potassium. |
| Crude Oil | 2 ml (Texas Beeville Crude) |
| microbe culture | 0.5 ml of a mixed culture from Oppenheimer (Austin, Texas, U.S.A.). The culture contents was not disclosed by Oppenheimer. |
| Beads/catalyst | 2 g |
| Beads | 2 g (SLG brand, water washed) |

Systems exposed to UV light were exposed to light in the 300 to 400 nm wavelength range, with a maximum at 365 nm with an intensity of 5.5–6.2 mW/cm$^2$. The pH of the system was adjusted to between 7–7.5 using 5% $Na_3PO_4$.

TABLE 2

| SAMPLE/ PROCEDURE | OBSERVATION | | |
|---|---|---|---|
| | INITIAL | 1 WEEK | 2 WEEKS |
| 1. Crude oil, UV radiation | Oil spread nicely to form a continuous layer. Clear water layer observed. | Oil layer thickness decreased. Water layer became turbid. | Oil layer thickness decreased. Turbidity of water layer increased. |
| 2. Crude oil, UV radiation, microbes | Oil spread nicely to form a continuous layer. Clear water layer observed. | Oil layer thickness decreased. Continuity of the oil layer began to disappear. Water layer became turbid. | Oil layer is not continuous. Tiny oil droplets formed. Turbidity of water layer increased. |
| 3. Crude oil, UV radiation, microbes, beads/catalyst | The beads soaked up oil. A brown colored layer of beads observed on the surface. Clear water layer observed. | Brown color of the beads began to fade. Water layer turned turbid. | The beads turned white. Turbidity of water layer increased. |
| 4. Crude oil, UV radiation, microbes, beads | The beads soaked up oil. A brown colored layer of beads observed on the surface. Clear water layer observed. | Brown color of the beads began to fade. Water layer turned turbid. | The beads turned white. Turbidity of water layer increased. |
| 5. Crude oil, UV radiation, beads/catalyst | The beads soaked up oil. A brown colored layer of beads observed on the surface. Clear water layer | Brown color of the beads began to fade. Water layer turned turbid. | The beads turned white. Turbidity of water layer increased. |

TABLE 2-continued

| SAMPLE/ PROCEDURE | OBSERVATION | | |
|---|---|---|---|
| | INITIAL | 1 WEEK | 2 WEEKS |
| | observed. | | |
| 6. Crude oil, UV radiation, beads | The beads soaked up oil. A brown colored layer of beads observed on the surface. Clear water layer observed. | Brown color of the beads is fading. Water layer turned turbid. | The beads turned white. Turbidity of water layer increased. |
| 7. Crude oil, microbes | Oil spread nicely to form a continuous layer observed. Clear water layer observed. | Oil layer thickness decreases. Water layer turned turbid. | Oil layer thickness decreased and the oil tended to form tiny droplets. Turbidity of water layer increased. |
| 8. Crude oil, UV radiation, microbes, MTMOS beads | The beads soaked up oil. Clumps of brown beads formed. Clear water layer observed. | Brown color of the beads began to fade. Water layer turned turbid. | Beads turned white and spread on the surface. Turbidity of water layer increased. |
| 9. Crude oil, UV radiation, MTMOS beads | The beads soaked up oil. Clumps of brown beads formed. Clear water layer observed. | Brown color of the beads began to fade. Water layer turned turbid. | Beads turned white and spread on the surface. Turbidity of water layer increased. |

The term "crude oil" means oil was in the sample. The term "UV radiation" means that the samples were irradiated with UV light, as discussed above.

Turbidity increase in the water layer was observed to be greatest in the samples with beads proposed according to Examples 2 and 3 above.

Fluorescence measurement of the water layer of photocatalysis samples was used to study the catalytic activity of the TiO$_2$ beads on the biodegradation of the crude oil by microbes. The following samples were analyzed.

A.
2.0 mL crude oil
UV radiation for 1 week
2.0 g beads/catalyst
B.
2.0 mL crude oil
0.5 mL microbes
C.
2.0 mL crude oil
0.5 mL microbes
2.0 g beads
D.
2.0 mL crude oil
0.5 mL microbes All samples contained 200 mL of nano water which has 7 drops of "Schultz-Instant" liquid plant food per L of water. Crude oil is Texaco Bruce #1. After 1 week under illumination, 0.5 mL of microbes was added to sample A which was kept for another week without UV light. Sample B was kept for 2 weeks without UV radiation. C and D were kept for week only and were not illuminated with UV light.

Figure 7:
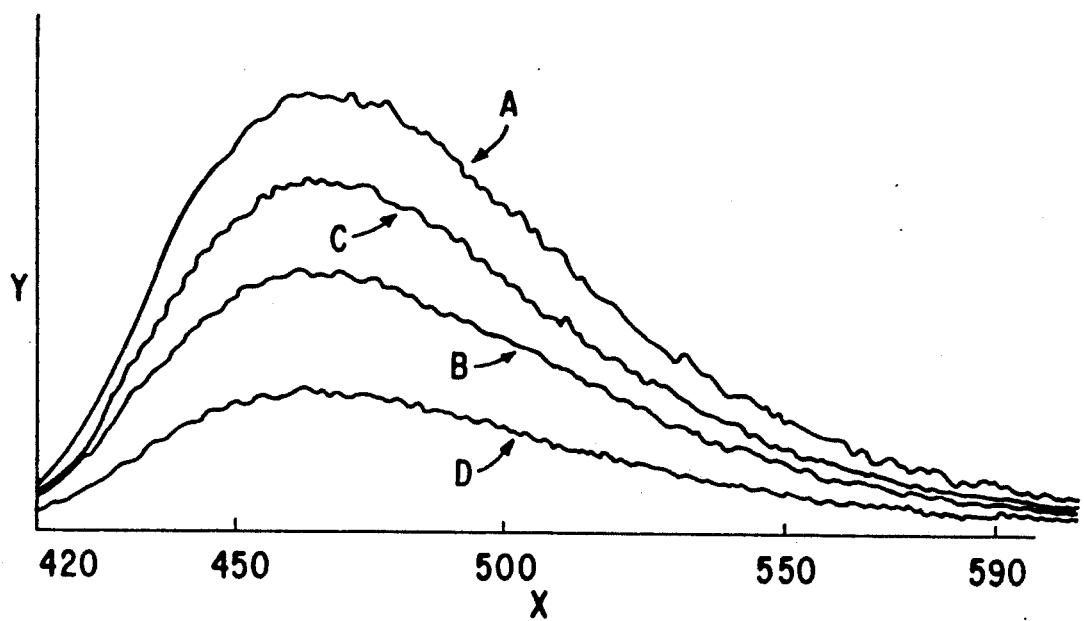
FIGS. 7-9 depict fluorescence measurements for certain samples that were treated with microbes, beads, and/or light.
Figure 8:
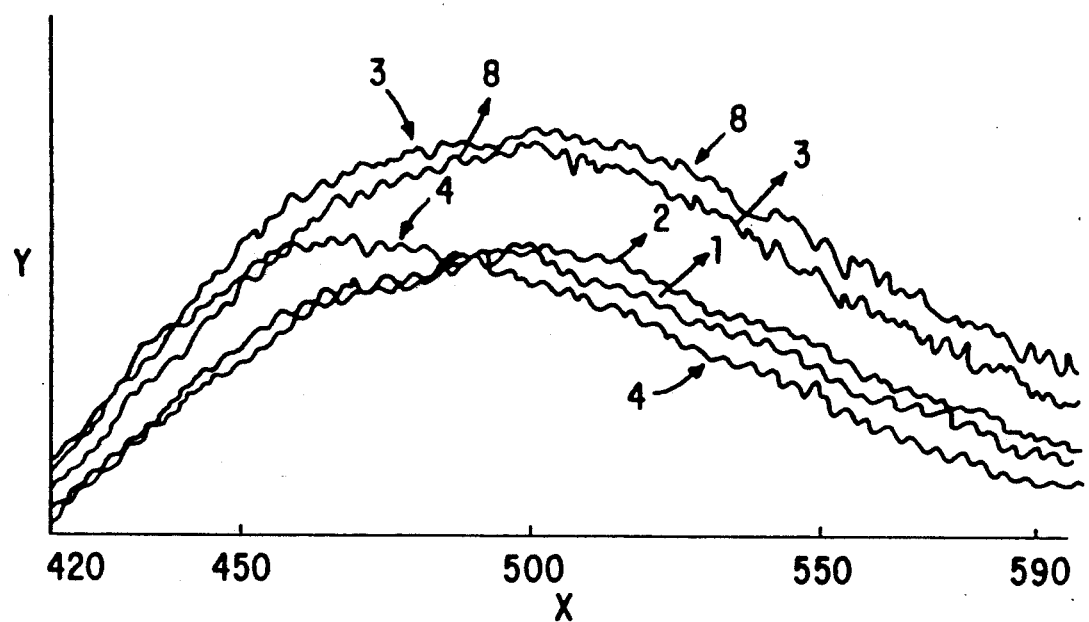
Figure 9:
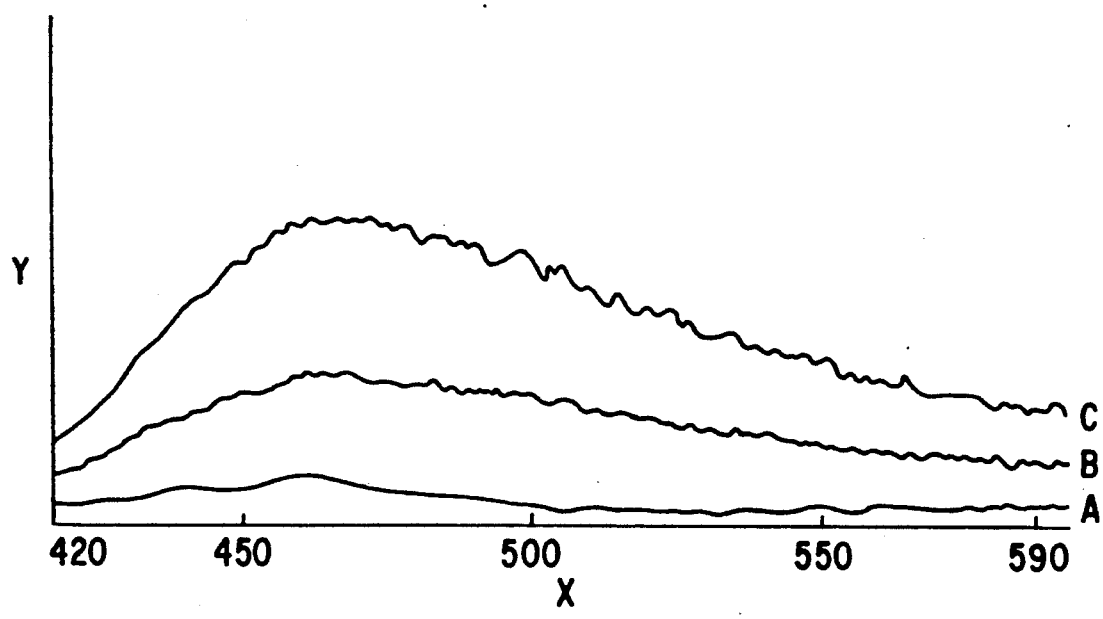

10 ml aliquots of the water layer were removed from the samples at the end of the experiment. All aliquots were centrifuged at 3,600 rpm for 15 minutes in a H1000B rotor using a RT6000B tabletop centrifuge (Dupont-Sorvall). The supernatant was removed and used for subsequent fluorescence measurements using a photon-counting spectrofluorometer Model 8000 (SLM Instruments, Inc.). Fluorescence measurements were done at an excitation wavelength of 400 nm. Some examples of the differences in the fluorescence spectra are shown in FIGS. 7-9.

EMBODIMENT 4—MICROBEAD COLLECTION OPTICS

In an alternate preferred embodiment, the microbeads of the invention have a specified amount of their exterior surface covered with catalyst. Alternately, the beads may be designed so that a certain percentage of the beads extends above the oil-air interface. Both the amount of surface coverage and bead extension above the interface may be optimized to enhance light collection optics of the beads. In other words, to determine the fraction of the solar UV flux captured by the TiO$_2$ coated hollow glass microbeads of arbitrary diameter floating at the oil/air interface, the optics of the system is analyzed. The procedures and results of this analysis are presented below.

EXAMPLE 8—COLLECTION OPTICS ANALYSIS

Upon absorbing a proton, an electron-hole pair may be generated in the TiO$_2$ microcrystal. The electron may react with surface-adsorbed oxygen, reducing it to hydrogen peroxide. The hole may oxidize adsorbed water to OH radicals and photons, and the OH radicals may oxidize in turn adsorbed organic compounds. The electrons react with oxygen and protons to produce hydrogen peroxide.

Titanium dioxide is denser than either oil or seawater. The density of anatase is 3.8, and that of rutile is 4.3.

Collection optics depends on the complex refractive indices of the glass, of the TiO$_2$, and of the oil in the UV band of interest—that is, 350-360 nm. Depending on their composition, the aluminosilicate glasses used may have real indices ranging from 1.48 to 1.73 at 350 nm. Both the literature and experimental measurements show that crude oils adsorb strongly in the UV. The absorbencies of three crude oils (Arab light, Arab heavy, Basrah light) at 350 nm ranged between $1.5-3.0 \times 10^4$ cm$^{-1}$. Thus a 2$\mu$m thick layer of one of these crudes adsorbs 95% of the solar UV flux at 350-360 nm. Therefore, it is preferred that the hollow glass beads have sufficiently low density to float on the surface at the air/oil interface, and are sufficiently buoyant so that less than one-half of the bead is submerged in the oil.

Description of the Model

Figure 10:
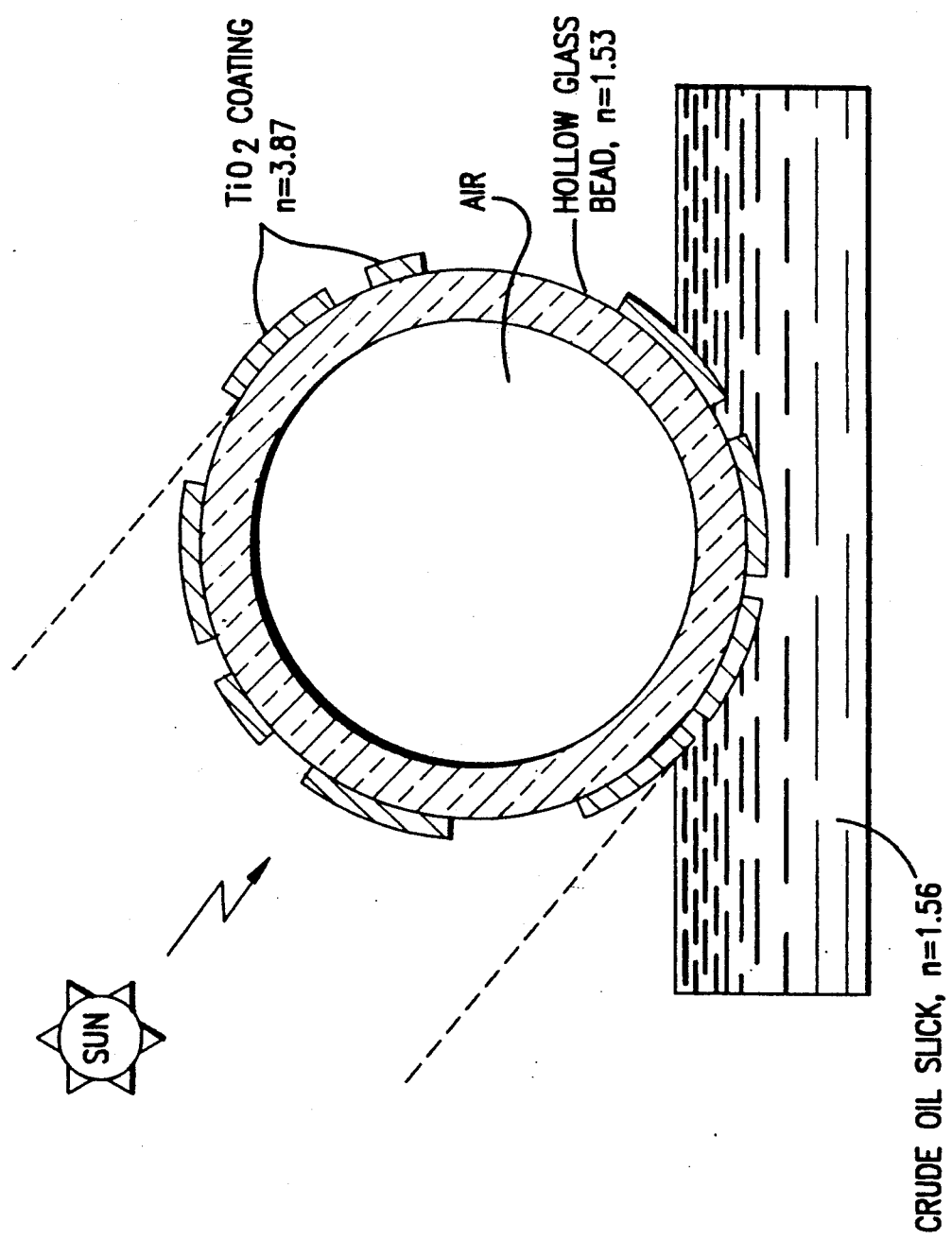
FIGS. 10-11 show catalyst distribution and photon flux on a bead on oil.
Figure 11:
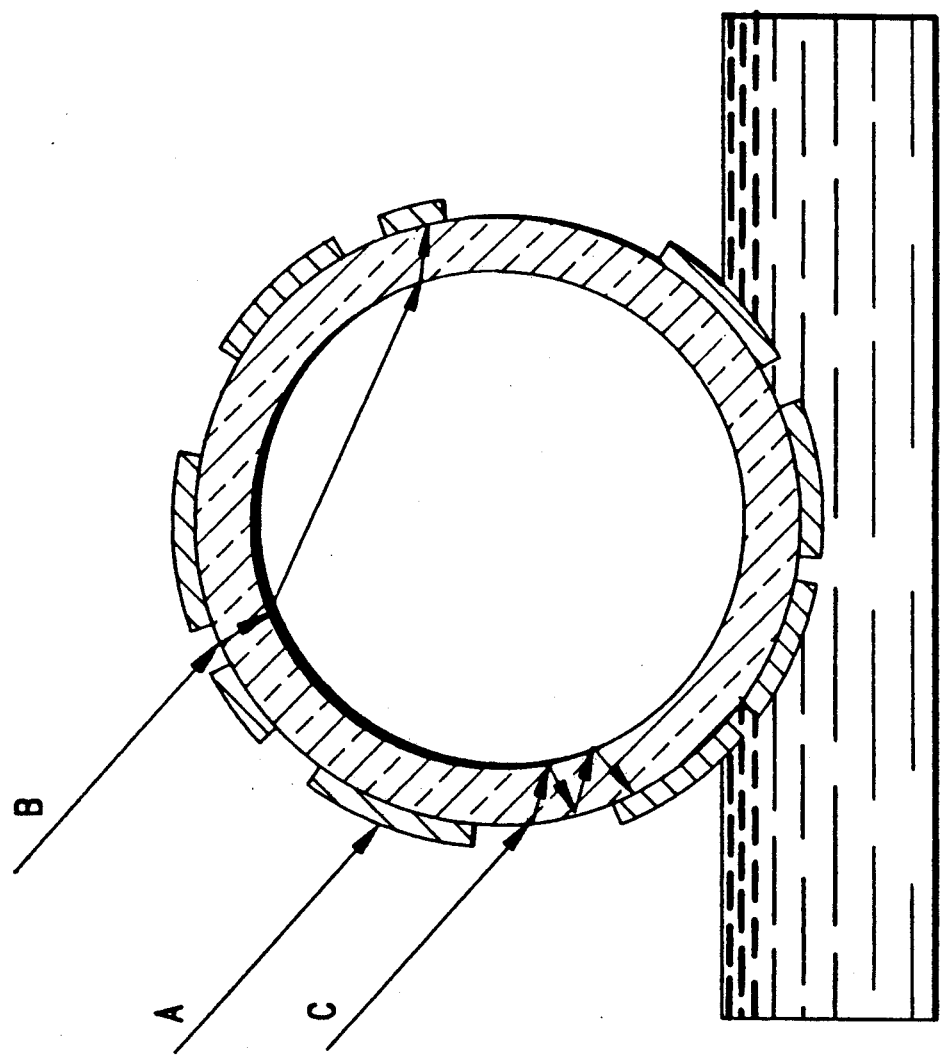

For the purpose of modeling the hollow beads were considered to be of arbitrary diameter with shells made of perfectly transparent aluminosilicate glass and a shell thickness about 10% of the diameter. The depth of immersion of a bead in an oil slick depends on the viscosity of the oil and its surface properties (which both vary with age of slick, temperature, etc.) as well as on the density of the bead itself. Therefore, for the initial estimate it is assumed that the bead is floating as shown in FIG. 10. In FIG. 10 the depth of immersion was about 15% of the external diameter of the bead. The incoming radiation was taken to be of unit intensity at 360 nm and made an angle of 45 degrees with the surface. The photon flux adsorbed by the TiO$_2$ particles has two components, an outer and inner flux, as indicated by FIG. 10. The outer flux involves absorption of solar photons that only pass through the atmosphere, for example Ray A, FIG. 11. The inner flux is composed of photons refracted into the bead at the air-glass interface and are subsequently absorbed by the attached TiO$_2$, for example Ray B or Ray C, FIG. 11. The collection of sunlight is analyzed for beads at varying photocatalyst coverages and varying immersion in the strongly UV light-absorbing crudes.

Theory

The optimum coverage of the microbead surface by the photocatalyst TiO$_2$ was analyzed first. Effectiveness function E of microbead coverage by monocrystals of TiO$_2$:

$$E = (I_{absorb}/I_{inc})/(S_{TiO_2}/S_{bead}) \quad (A)$$

$I_{absorb}/I_{inc}$ is the fraction of the incident solar flux at 360 nm adsorbed by the TiO$_2$. $S_{TiO_2}/S_{bead}$ is the fraction of the microbead surface area covered by TiO$_2$ monocrystals. The absorption of light depends on the position on the microbead surface of the TiO$_2$ layer relative to the zenith angle of the sun. Therefore, a series of calculations was performed for different TiO$_2$ monocrystal bead-surface distributions and coverages.

An angular absorption function (AAF) was introduced that relates the absorbed light with the TiO$_2$ monocrystal layer's "center" polar angle $A(\Phi)$ for a layer of area S. Assuming that occupation of all positions on the bead's surface by the TiO$_2$ layer have uniform probabilities, we can consider an angle-averaged absorption $A_{av}$ by a TiO$_2$ crystalline layer (regardless of its position on the glass bead) can be considered to only depend for optically thick crystallites on the covered area T of the bead. This is:

$$A_{av}(T) = 1/2\pi \int_0^{2\pi} A(T,\Phi)d\Phi, \quad (1)$$

where $A(T,\Phi)$ is the amount of energy absorbed by a TiO$_2$ layer of area T with its center at the polar angle $\Phi$.

Similarly, for microbeads of irregular shape it is necessary to define:

$$A_{av}(T) = \frac{\int_S A(T,u,v)dS}{\int_S dS}, \quad (2)$$

where u,v are the current coordinates of the microbead surface and dS is a surface element.

It also may be necessary to consider the probability distribution P(u,v) will depend on physical and chemical factors such as surface tension, density of the oil, the way the photocatalyst is attached to the bead, etc. So, eq. (2) can be generalized as:

$$A_{av}(T) = \frac{\int_S A(T,u,v)P(u,v)dS}{\int_S dS}, \quad (3)$$

For example, when the monocrystal TiO$_2$ layer is thick and the glass microbead shell is thin enough so that their weights are comparable, the TiO$_2$ layer is likely to be found near the submerged pole of the microbead. In this case P(u,v) would be:

$$P(u,v) = \delta(u-u_o)\delta(v-v_o) \quad (4),$$

where $U_o$ and $V_o$ are the coordinates of the submerged layer "center" and $\delta$ designates the delta-function. Thus, from (4) and (3):

$$A_{av}(T) = A(T, u_o, v_o) \quad (5)$$

Figure 12:
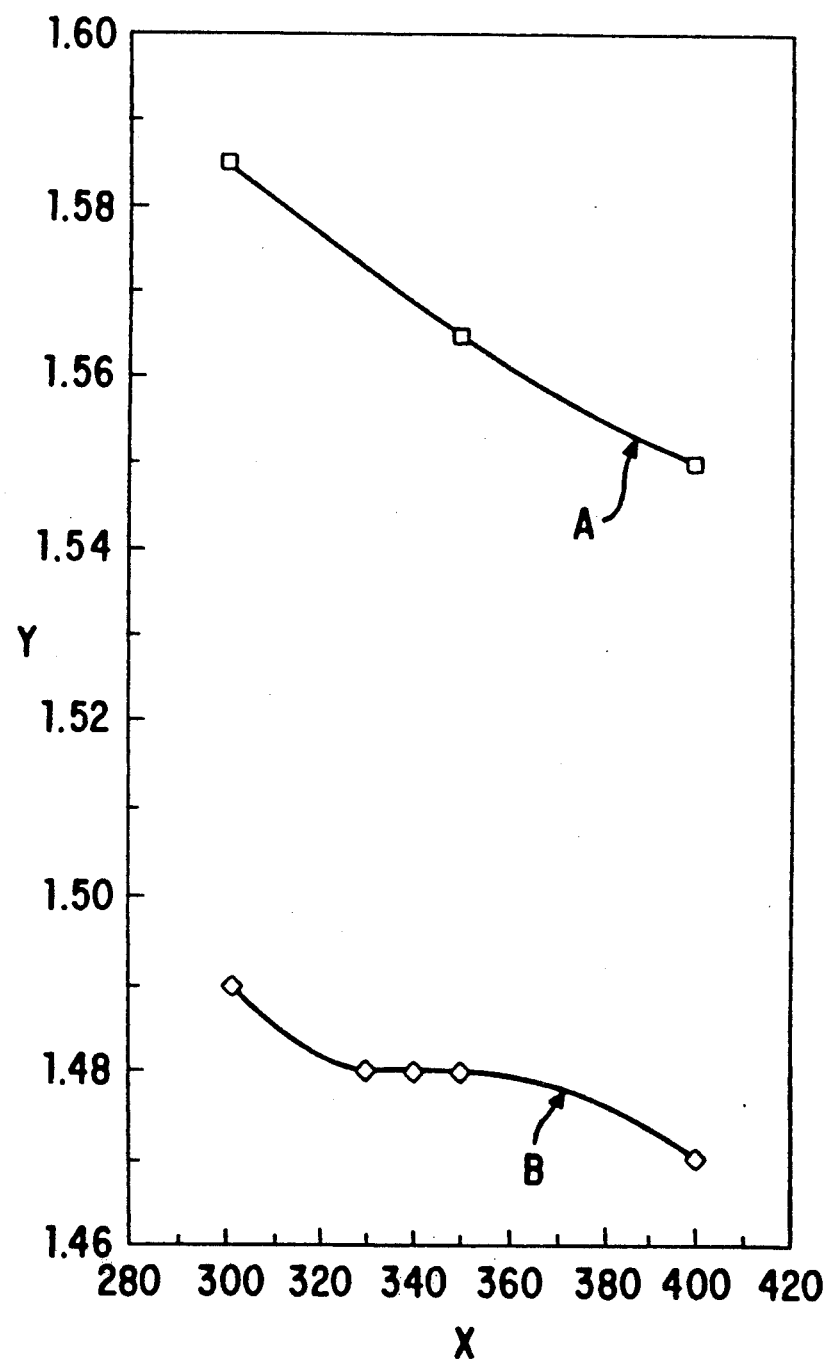
FIG. 12 shows light dispersion of oil (A) and fused quartz (B).
Figure 13:
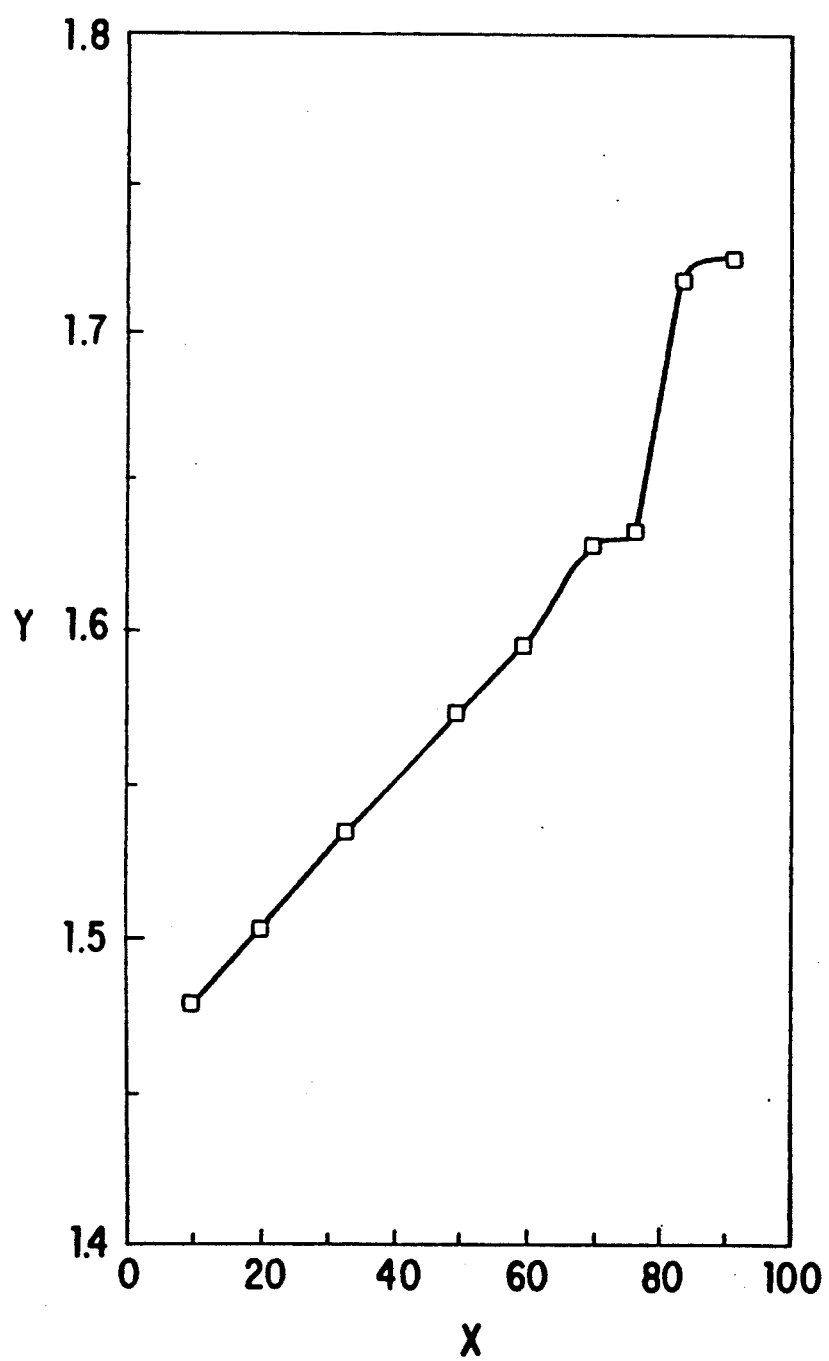
FIG. 13 shows the refractive indices of aluminosilicate glasses as a function of their relative composition.

The solar flux incident on the glass microbead is reflected and refracted according to the Snell's law and the Fresnel formulae (separately for the s- and p- components). It is a function of the indices of refraction of the glass (N=1.53), oil (N=1.56) and TiO$_2$ for rutile (N=3.87) at $\lambda$=360 nm. "Index of refraction" refers only to its real part. For silica glass and oil the variation in the indices with wavelength, i.e., dispersion in the near UV does not exceed 1% (FIG. 12). In FIG. 12, the Y-axis is the index of refraction and the X-axis is the wavelength in $\mu$M. The curve is the dispersion of oil (Curve A) and fused quartz (Curve B). However, the index of aluminosilicate glasses (Al2O3-SiO2) depends strongly on their alumina content (FIG. 13). In FIG. 13, the Y-axis is the index of refraction and the X-axis is the composition (mole % of Al$_2$O$_3$).

In our model any TiO$_2$ monocrystallite layer is considered to be continuous, having boundaries that are parallel to the surface of the bead, and thick enough to absorb all of the photons with energies exceeding the band-gap. Provided the bead density is much less than the density of the oil, the beads are floating on the surface as shown in FIG. 10.

Figure 14:
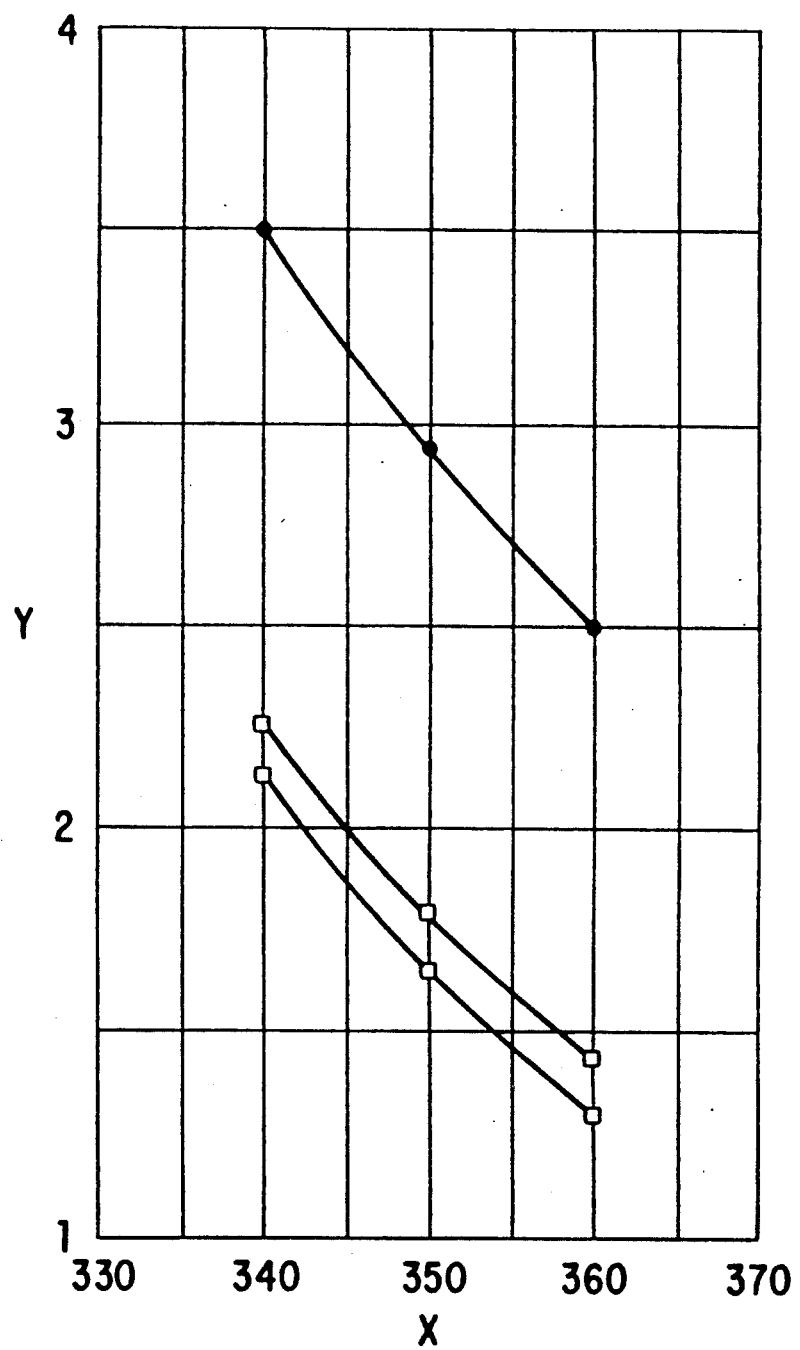
FIG. 14 shows the absorbance of several Middle East Crudes.

UV absorbance of some crude oil samples from the Middle East was measured. The results of these measurements are presented in FIG. 14. This FIG. 14 shows that the UV light is strongly absorbed by the crudes. Curve A represents Basrah light, Curve B is Arab light, and Curve C is Arab heavy. The FIG. 14 Y-axis is the absorbance, in $\mu M^{-1}$, and the X-axis is the UV wavelength in $\mu$M.

As described above, in the calculations we considered a normalized parallel incident radiation, with the wavelength set a $\delta$=360 nm. The characteristic distances are considerably larger than $\delta$, so that diffraction may be neglected and Monte-Carlo method with geometric optics are applied. The fraction of the incident UV-flux absorbed by a crystalline layer of TiO$_2$ as a function of the fraction of the microbead surface covered was calculated.

Results

Figure 15:
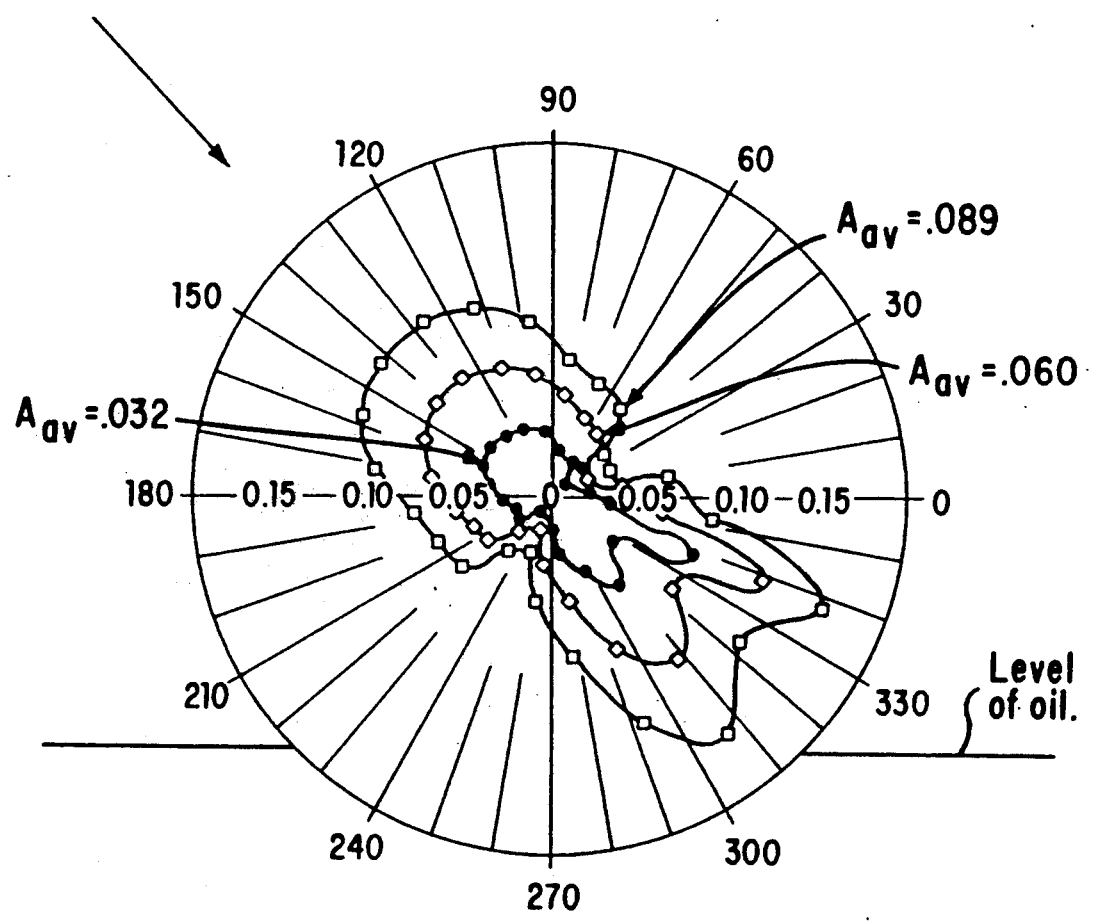
FIGS. 15-16 show the absorbed ultraviolet light fraction for various bead surface coverage by titanium dioxide.
Figure 16:
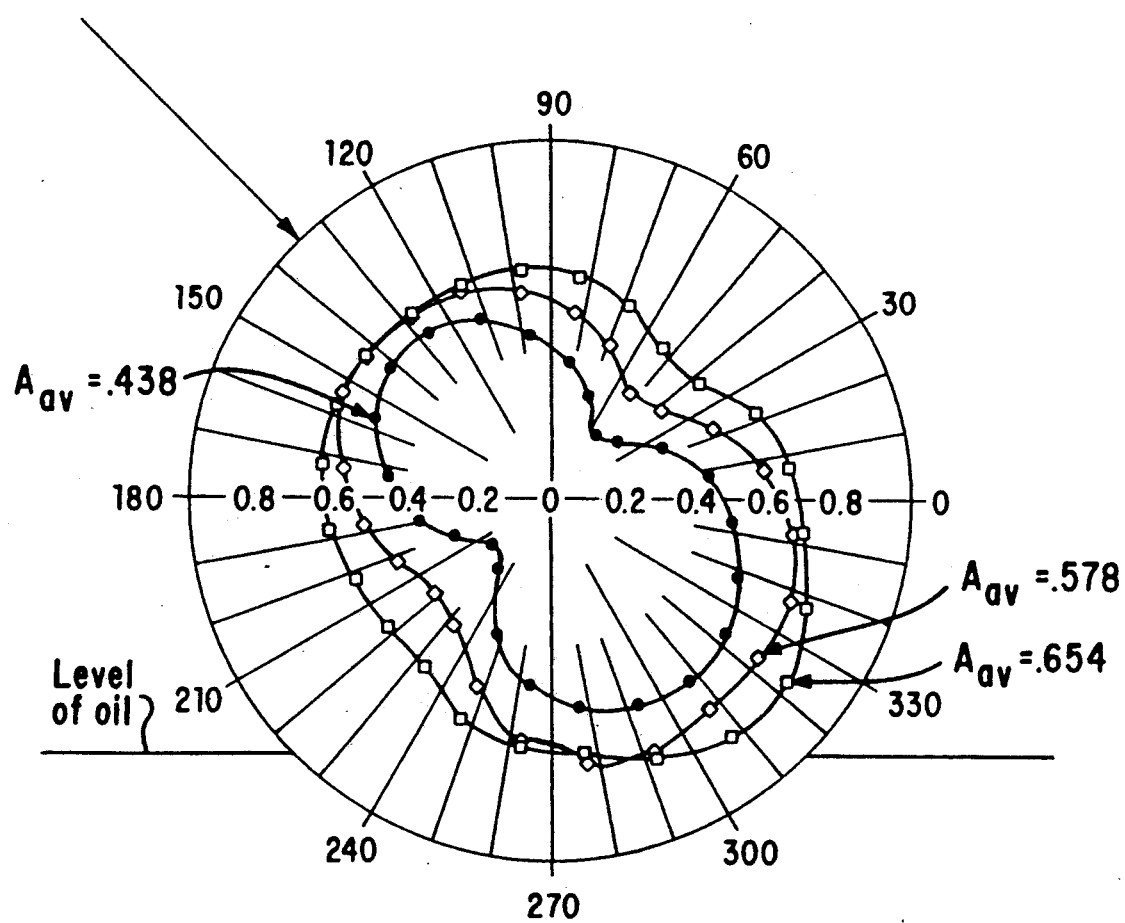

The results of the numerical analysis for TiO$_2$ layers sited at a set of arbitrary positions on the microbead surface covering 2,4 and 6 percent of the surface are shown in FIG. 15. The larger the area covered, the more circular AAF becomes. Results for layers that occupy 34, 50, 66 percent of the surface are presented in FIG.

The AAF of the bead totally covered by $TiO_2$ is a perfect circle (a perfect sphere in three dimensions). At total coverage, $A_{av}=0.65$ and absorption is independent of the optical properties of the glass bead. Upon complete coverage of the microbead surface by a $TiO_2$ layer, it is only necessary to consider the absorption and reflection of the incident light by the $TiO_2$ crystallites. At full coverage a substantial 35% of the incident light is scattered and reflected by the layer because of the large difference between the indices of refraction of rutile (N=3.87) and air (N=1).

Figure 17:
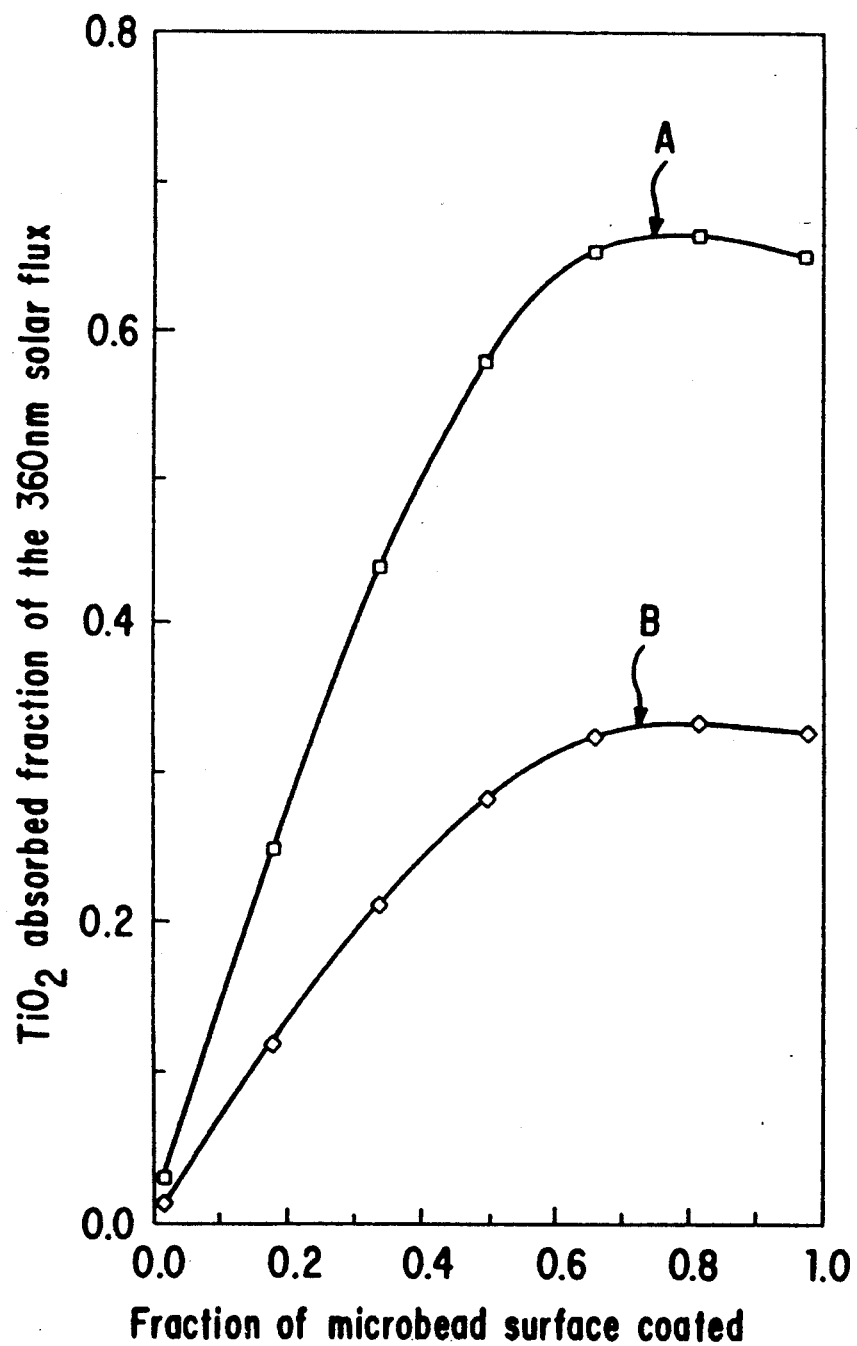
FIG. 17 shows the calculated fraction of the incident solar UV flux absorbed by the titanium dioxide coating as a function of the area of the bead coated by the titanium dioxide coating.

The fraction of the solar UV flux absorbed by the photocatalyst for intermediate values of $TiO_2$ coverages $^sTiO_2/^s$ bead was calculated as shown in FIG. 17 (A). This fraction is almost linear for ratios between 0 and 0.45 meaning that as long as $^sTiO_2/^s$bead is less than 0.5, the separated areas coated by the photocatalyst absorb incident light independently. When the coated area increases from 0.45 up to 1.0 the E-function is no longer linear indicating interaction between the $TiO_2$ covered areas, i.e., shading. When $^sTiO_2/^s$bead reaches 0.7, the effectiveness function is at its maximum of $E_{max}=0.65$. Here part of the light passes through the uncoated portion of the glass shell (30% of the bead area) and is absorbed at the $TiO_2$ glass interface, as for Rays B and C of FIG. 11. Thus a further increase in the fraction of the $TiO_2$ covered area tends to increase the reflection of incident light from the surface of the microbead, tends to decrease the amount of light collected by the microbead shell, consequently causing a drop in the fraction of incident photons absorbed by the $TiO_2$ coating.

Calculations for $TiO_2$ layers of irregular form and large area show that the effectiveness of absorption depends, within the accuracy of $\pm 0.5\%$, only on the area of the layer, but not on its shape. While this was obvious on the linear part of the absorption curve, for coverages exceeding 0.45 it required proof. As they are, the results are now valid for any arbitrary statistical distribution of the coverage by $TiO_2$ crystallites on the surface of the bead.

The optical characteristics of different crude oils vary from light to heavy oils. For $\lambda=360$ nm, the extinction is generally in the 1700 $cm^{-1}$ to 6500 $cm^{-1}$ range. Hence, the characteristic absorption lengths are 6 $\mu$m to 1.5 $\mu$m for light and heavy crudes respectively. Therefore, the light is refracted and collected by the partial $TiO_2$ layer, enters at the air-glass interface, but not at the oil-glass interface. Calculations confirm that, to a first approximation, the average absorption $A_{av}$ by the photocatalyst is proportional to the incident flux at the air-glass interface.

Figure 18:
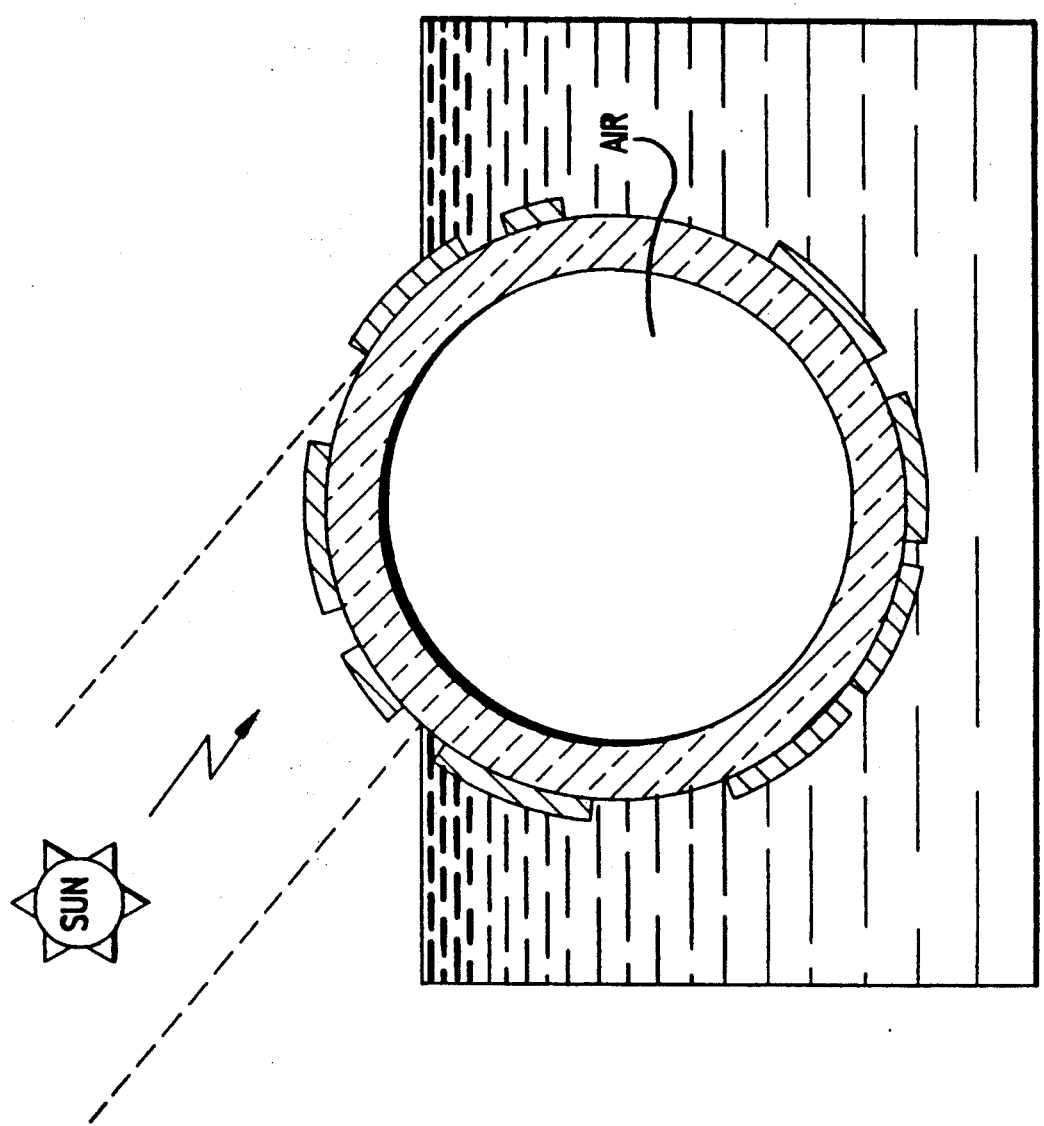
FIG. 18 shows a hollow glass bead partially covered by titanium dioxide and deeply immersed in oil.
Figure 19:
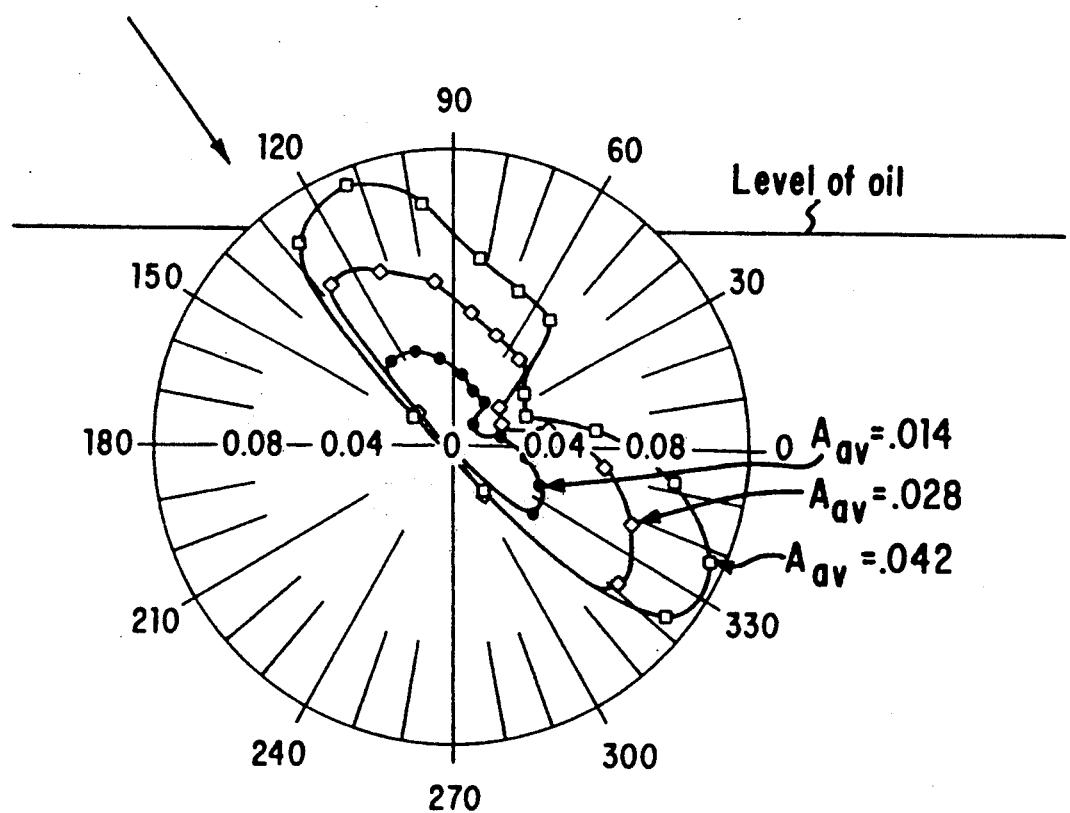
FIG. 19 shows the absorbed UV fraction for various bead surface coverage by titanium dioxide.
Figure 20:
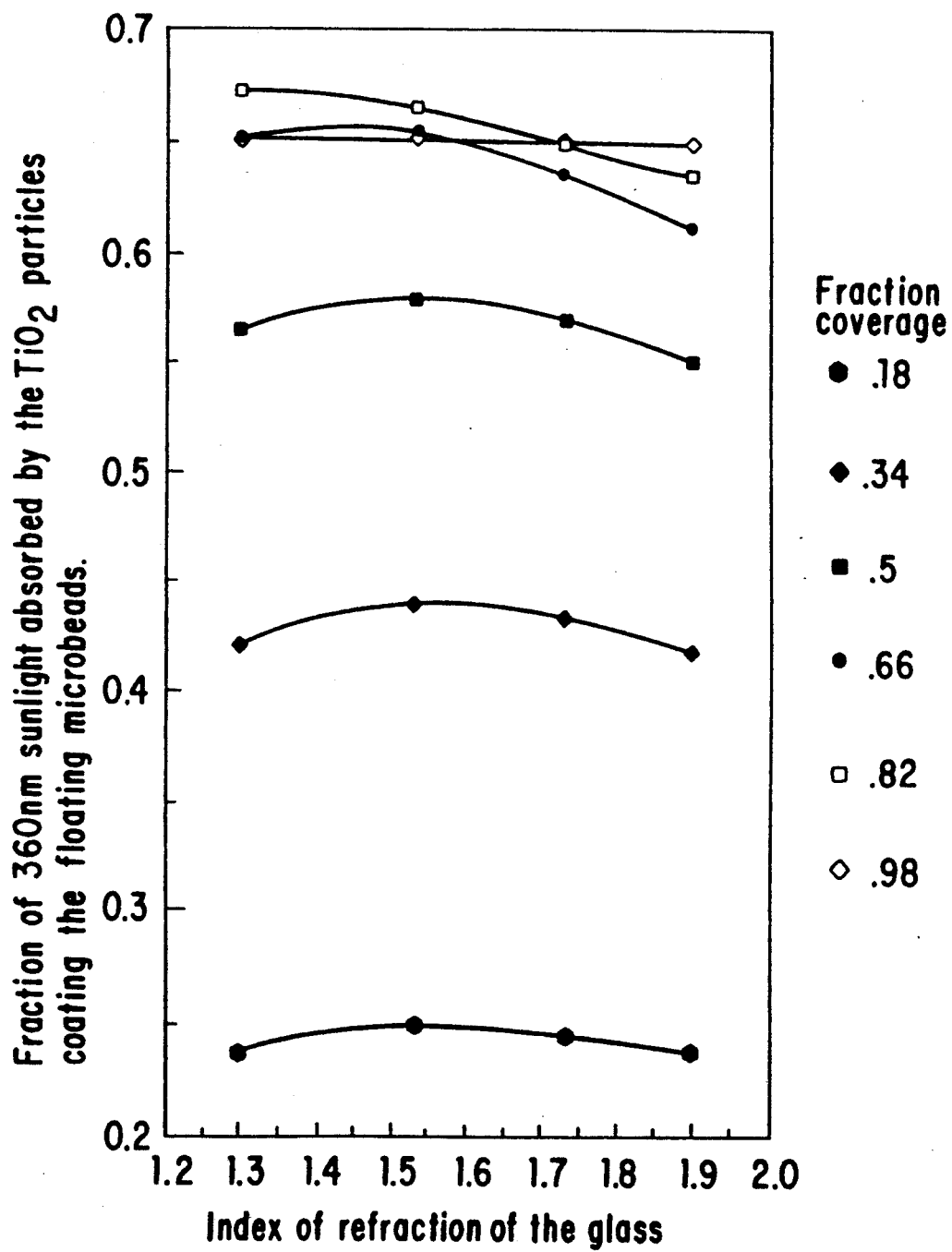
FIG. 20 shows the calculated fraction of the incident 360 nm solar flux absorbed by the titanium dioxide coating as a function of the index of refraction of the glass of the beads.
Figure 21:
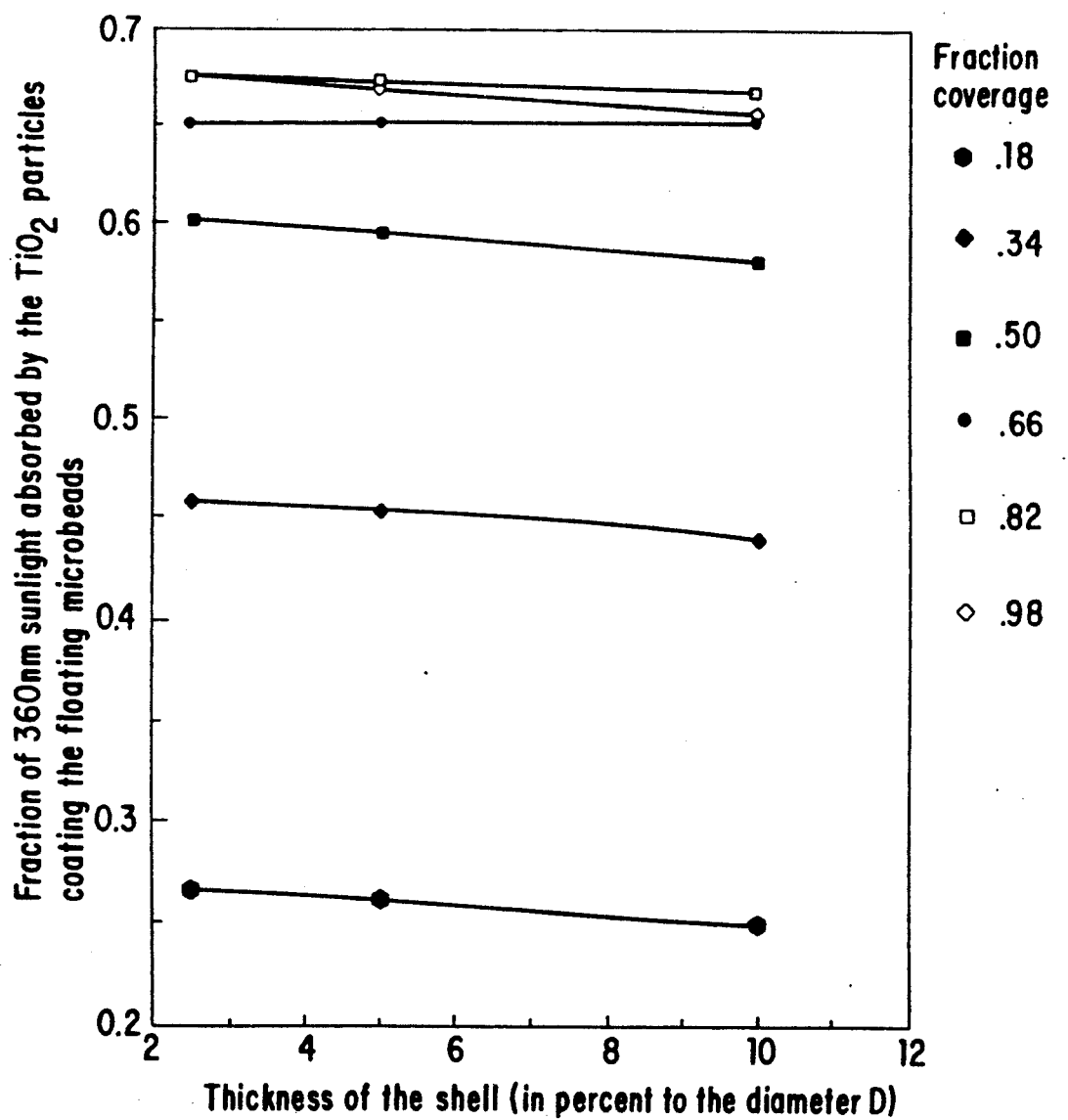
FIG. 21 shows the calculated fraction of the incident 360 nm solar flux absorbed by the titanium dioxide coating as a function of the thickness of the shell of the beads.

Also considered was the case where a microbead is almost totally immersed in an oil layer, as shown in FIG. 18. In this case most of the attached photocatalyst is immersed in the highly absorbing crude oil layer. The AAFs shown in FIG. 15 for a microbead with most of its surface above the oil layer change to those shown in FIG. 19 for the nearly submerged microbead. The AAFs become more stretched and decrease in value because the incident flux pencil is narrowed. They are less symmetrical with respect to the incident flux direction because the whole optical system becomes less symmetrical. Corresponding values of average absorption are shown in the same figure. The effectiveness of the photocatalyst layer for this case is shown in FIG. 17(B). It reaches its maximum $E_{man}=0.35$ when $^sTiO_2$ bead equals to 0.7 —i.e., at the value derived for the first case (FIG. 17 (A)). This means that an increase in the fraction of the microbead surface covered by the photocatalyst does not necessarily increase the fraction of absorbed light by the photocatalyst; it only tends to increase the fraction of the scattered light. This conclusion also bears on the design of photoreactors where it is unlikely that the fully $TiO_2$ coated glass surface will be optimal for efficiency.

Analysis of the optimum optical parameters of the floating microbead of FIG. 10—i.e., the optimal index of refraction of the glass microbead and the optimal thickness of its shell, shows that the fraction of light absorbed by the photocatalyst depends only slightly on these parameters. (FIGS. 20 and 21).

Conclusion

The efficiency of UV light collection by a $TiO_2$ photocatalyst on an aluminosilicate glass microbead tends to peak near 70% coverage layer, where about 65% of the direct sunlight is absorbed. At greater coverage the collection efficiency decreases because of reflection. About half of the incident solar UV flux is collected at 40% $TiO_2$ coverage. In this case, most of the light absorbed by $TiO_2$ particles tends to come from inside the microbead. The solar UV ray now passes into the glass at a region that is not coated by $TiO_2$ and undergoes multiple reflections and refractions inside the microbead until it reaches a $TiO_2$ coated area where it is absorbed. This means that the $TiO_2$ particles will act as an effective photocatalyst, no matter where they are positioned on the bead, as long as they contact oil. This conclusion is valid for a floating bead of any size.

A question has been raised as to the validity of the model given here in the event that the beads may tumble and become coated with an oil layer which would prevent capture of UV light by the attached $TiO_2$. Experim:ntal trials with beads show that this does not happen and oxidation of oil occurs with reasonable efficiency.

From an engineering point of view, because $TiO_2$ is more expensive than the microbeads, it is possible to coat only about ⅓ of the microbead surface, yet still collect half the UV photons (FIG. 17, the ascent part of the upper curve A). Because of the strong absorption of UV light by crude oils, it is preferred that the microbeads be sufficiently light, that they float with a minimum of their surface immersed in the oil.

If microbeads were expensive relative to the titanium dioxide needed, about 70% of the surface should be covered by $TiO_2$ in order to maximize the collection of UV photons by the photocatalysts; in this case, about 65% of the direct UV flux would be collected by the $TiO_2$ layer.

Some factors were not considered in this study. The scattered light field at the surface of the oil was not taken into consideration nor was the dependence of UV light flux on the atmospheric mass (zenith angle of the sun). The UV sunlight spectrum near the oil-air interface was not examined. The glass of the microbeads, considered here to be absolutely transparent may actually absorb because of $Fe^{3+}$ impurities. In spite of these omissions, however, the principal results concerning the optics of the glass microbeads covered by monocrystal $TiO_2$ are valid.

EMBODIMENT 5—PALLADIUM

In an alternate preferred embodiment, the microbeads of the invention may be at least partially coated with a semiconductor the surface of which is coated palladium. This system, under illumination and in the presence of air, is capable of accelerating the oxidation of organic compounds floating on water. The coating material may include approximately 0.001 to 3.0 weight percent palladium in the semiconducting catalyst (e.g. the $TiO_2$), more preferably approximately 0.01 to 0.5 weight percent palladium.

The catalytic reaction of organic compounds on water is believed to involve oxidation of surface-adsorbed water by holes to produce OH radicals that oxidize organic compounds. This reaction is believed to be coupled with reduction of dissolved $O_2$, initially to peroxide and then ultimately to water. At high concentrations of organic reagents, and at high irradiance, the rate of the hole initiated oxidation may be fast, but it may not be faster than the rate of $O_2$ reduction by electrons. When $O_2$ is not reduced at a high enough rate, electrons tend to accumulate on the photocatalyst and the rate of radiationless electron-hole recombination is enhanced until the sum of the rates of recombination and electron transfer to oxygen tends to equal the rate of photogeneration of holes. Thus the rate of photooxidation may equal, and be limited by, the rate of $O_2$ reduction.

It is possible to estimate the light flux and particle size where the quantum efficiency in a $TiO_2$ particle slurry becomes $O_2$ reduction rate rather than mass transport limited. It is predicted that this is the case when the particles do not have a particularly high density of shallow, near surface electron traps to assist in the $O_2$ reduction process. Whether such traps are present or not, but particularly in the absence of a high density of such traps, modification of the surface by a catalyst for $O_2$ reduction, such as by Group VIII metal, should increase the quantum efficiency of photoassisted oxidation. Although the experiments below were performed on $TiO_2$ slurries, it is proposed that they are equally applicable to floating photocatalytic microbeads.

It is believed that the slurry experiments below show that the efficiency of the photoassisted oxidation of organic solutes (1.6 M methanol and $10^{-2}$M 2,2'-dichloropropionate) in water by dissolved $O_2$ is limited by the rate of electron transfer from the $TiO_2$ particles to $O_2$; that even in $O_2$ saturated solutions the electrons stay on the $TiO_2$ particles for at least ~1 min.; that the particles are rapidly depolarized if partially coated with Pd; and that the quantum efficiency of photoassisted oxidation of organics by $O_2$ is increased when the $TiO_2$ particles are Pd activated.

EXAMPLE 9—PALLADIUM ANALYSIS, SLURRY CELLS

Figure 22:
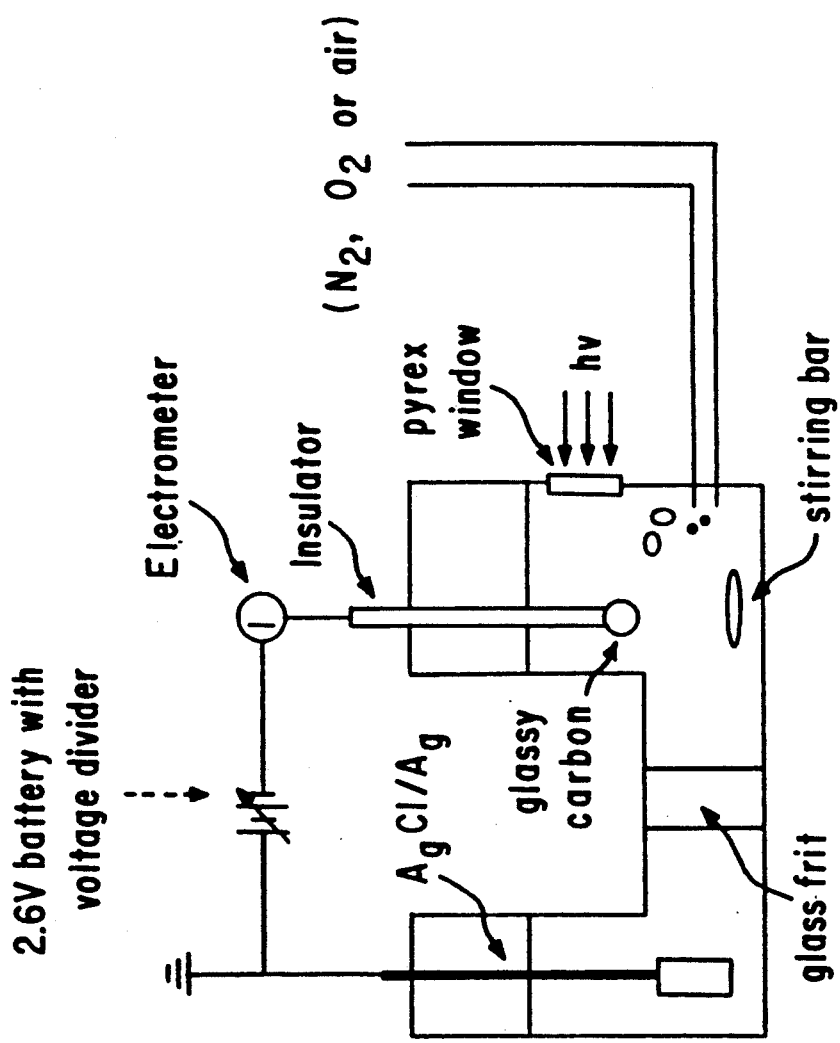
FIG. 22 shows a cell used for methanol oxidation experiments.

Two cells were used, one for the methanol oxidation experiments, the other for the sodium dichloropropionate oxidation experiments. Both cells were designed to allow control of the atmosphere. The cell used for the methanol experiments (FIG. 22) had two compartments separated by a fine glass frit. The cell was designed so that the particles in the slurry, illuminated at the window in the front of one compartment, had to travel for >1 s and cover distance of ~2 cm in order to discharge their excess charge at a vitreous carbon electrode in the back of the same compartment, where the UV flux was negligible. Vitreous carbon was chosen for charge collection because of its inertness in both oxidation of methanol and reduction of oxygen or water in the potential range where $TiO_2$ particles can exchange electrons with it. The charge-collecting glassy carbon electrode (Atomergic, N.Y., U.S.A.) was of 0.3 cm diameter and 0.65 cm length. Contact to it was made with a silver epoxy to a copper wire. The Ag/AgCl electrode in the second compartment consisted of a 0.1 cm thick 1×2 cm silver foil. Before each measurement the Ag/AgCl electrode was cleaned in concentrated $NH_4OH$, reanodized in 1 M HCl and its $-(0.040-0.045)$V potential vs. SCE (i.e. standard calomel electrode) was confirmed. The $TiO_2$ slurry in the illuminated compartment was magnetically stirred and purged with $N_2$ (99.9%), $O_2$ (99.9%) or air for 30 min. before each measurement. The slurry consisted of 5 mg of the $TiO_2$ or $Pd/TiO_2$, 75 mL of water or an NaCl solution in water and 5 mL of methanol. Prior to introduction into the test chamber, 40 mL of the slurry was sonicated for 5 min. These 40 mL were poured into the illuminated compartment, while the remaining 35 mL were poured into the second compartment, containing the Ag/AgCl electrode. The front of the illuminated compartment, having the glassy carbon electrode in its dark back, was illuminated using a 500 W Hg lamp (Oriel, Conn., U.S.A.) the light of which was passed through a 10 cm thick water filter and through an Oriel Model 53410 narrow band interference filter. The area of the Pyrex window through which the cell was illuminated was 3.75 $cm^2$ and the UV ($\lambda<400$ nm) irradiance on the window was 0.5mWcm$^{-2}$ corresponding, for 3.5 eV photons, to $5.3\times10^{-6}$ einsteins cm$^{-2}$h$^{-1}$ and for the 3.75 $cm^2$ window to $2\times10^{-5}$ einsteins h$^{-1}$.

The electronics consisted of a regulated power supply (Lambda Electronics, Melville, N.Y., U.S.A.), mercury batteries (2.3 V) with a homemade voltage divider, a Keithley 614 electrometer, and a Kipp and Zonen BD91 XYY't recorder.

The second cell, in which the experiments with sodium dichloropropionate were performed, was a 2.5×2.5×5 cm Pyrex cuvette with an attached 100 mL bulb containing $O_2$, $N_2$ or air and magnetic stirring. The UV ($\lambda<400$ nm) irradiance on the 2.5×5 cm face was 50 mWcm$^{-2}$, corresponding for 3.5 eV photons face was $5.3\times10^{-4}$ einsteins cm$^{-2}$h$^{-1}$, and the total flux on the 12.5 $cm^2$ illuminated face was $6.7\times10^{-3}$ einsteins h$^{-1}$. The slurry for the measurement of the rate of photodegradation of sodium 2,2'-dichloropropionate ($10^{-2}$ M in water) consisted of 150 mg $TiO_2$ or $Pd/TiO_2$ suspended in 30 mL of water. The $O_2$ pressure was maintained near 1 atm. The entire UV flux was absorbed, i.e., the UV flux at the back of the cell was close to nil.

The $TiO_2$ used was a sample of Hombitan TM from Sachtleben, Hamburg, Germany. The material of 0.1–0.3μm particle size and anatase phase was calcined prior to use in air at 500° C. The 3 wt % Pd/$TiO_2$ samples were prepared by photoelectrodepositing Pd on the $TiO_2$ particles in an aqueous slurry (20 mL) containing $PdCl_2$ (25 mg), $TiO_2$ (0.5 g) and glacial acetic acid (1 mL). Following sonication, the suspension was stirred under UV illumination for 5 h. The photoelectrodeposition process involved photoassisted oxidation of acetic acid coupled with reduction of $Pd^{2+}$ to $Pd^°$, a possible net reaction being.

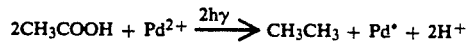

$$2CH_3COOH + Pd^{2+} \xrightarrow{2h\gamma} CH_3CH_3 + Pd^° + 2H^+$$

The bluish black Pd/$TiO_2$ powder was thoroughly washed with deionized water, filtered and dried at 120° C.

Results and Discussion

Negative Charge Accumulation on TiO$_2$ Particles During Photooxidation of That the Pd° catalysis observed is associated with transferring of electrons to O$_2$, not with a hole or OH reaction, is seen in experiments on 1.6 M methanol in water. These were performed in the cell of FIG. 22 having two features. First, after the optically dense slurry is loaded into the illuminated compartment, the UV flux in the back of the compartment, where the charge-collecting glassy carbon electrode is located, is essentially nil. Thus, the slurried particles need to traverse a distance of ~2cm after their illumination in order to reach the non-illuminated glassy carbon electrode. The particle transit time, determined by the rotation rate of the magnetic stirrer, is greater than 1 s. Therefore, the only charge on the particles that is observed is the charge that is not rapidly dissipated by oxidation or reduction of solution components, i.e., only long-lived electrons or holes on the particles are observed. Second, the counter/reference Ag/AgCl electrode was located in a compartment separated from the illuminated one by a frit through which TiO$_2$ particles could not pass. Thus, the counterelectrode reaction did not interfere with the observations of the charge of the particles in the illuminated compartment.

As will be evident from FIGS. 23-27 the time constants for the measured charge transfer are much slower than those previously observed in the art. The slow 1-3 min. response of the current at the collector electrode after the onset of the illumination and the slow decay afterwards in the dark are caused by the time required for the large number of particles to reach a stationary state between excess charge generation during light absorption and charge gain or loss at the electrode interface involving transit of the particles through the cell. The photon flux to which the particles are exposed depends on their location in the beam, varying continuously through the cell. In experiments reported by other persons in the art, the collector electrode itself was exposed to the light beam and the particle concentration was much smaller. The fast response probably resulted from the particles actually sticking to the collector electrode.

In aqueous methanol, where the initial reaction with an OH radical produces a highly reactive intermediate, electron injection, leading to current doubling, according to eq. 1.

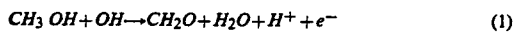
$$CH_3OH + OH \rightarrow CH_2O + H_2O + H^+ + e^- \qquad (1)$$

is likely. The overall single-photon assisted initial oxidation reaction (eq. 2) is

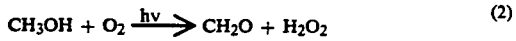
$$CH_3OH + O_2 \xrightarrow{h\nu} CH_2O + H_2O_2 \qquad (2)$$

Figure 23:
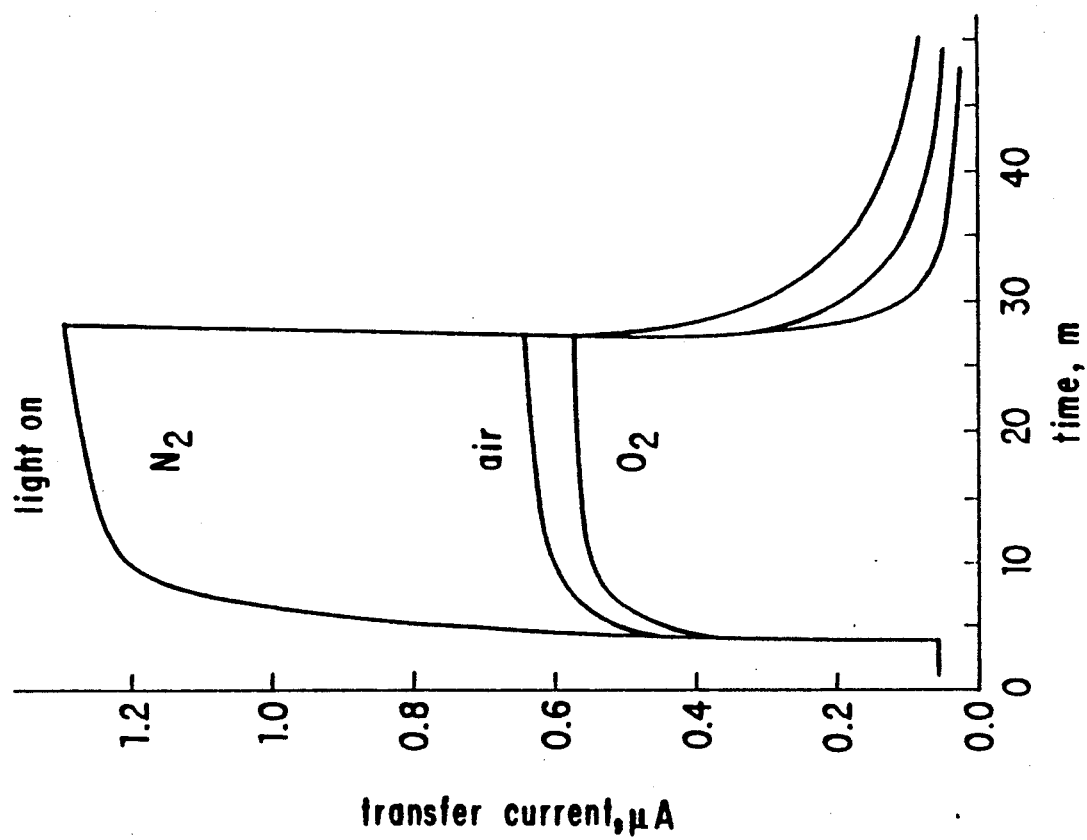
Figure 24:
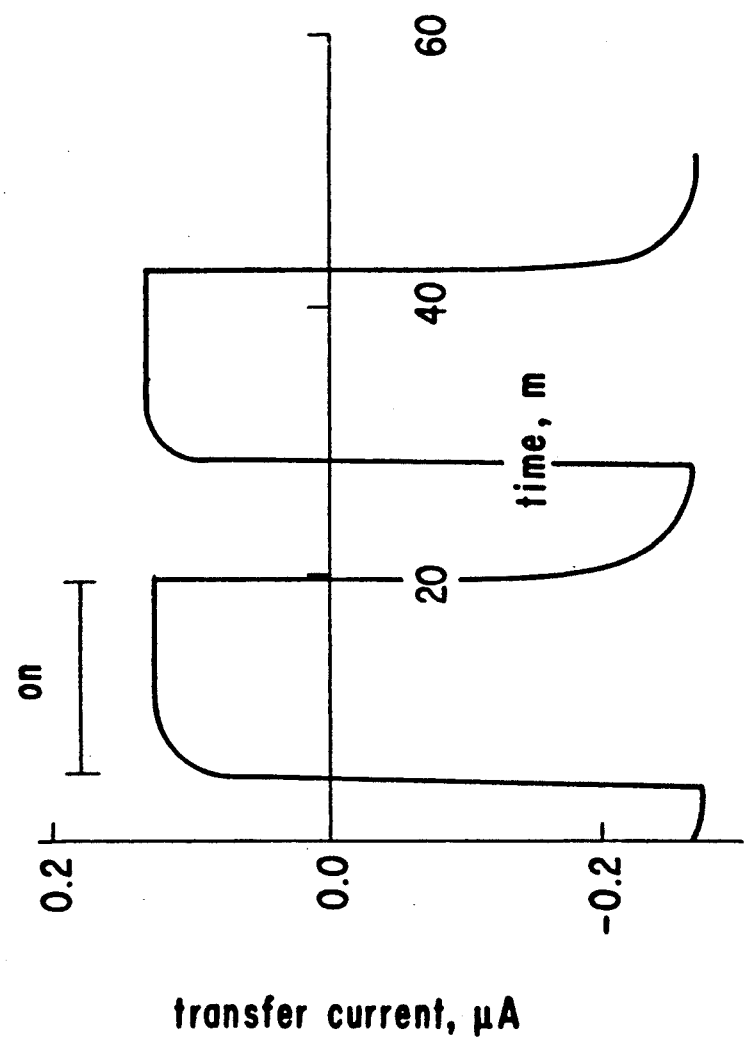

FIG. 23 shows the current collected at the vitreous carbon electrode when maintained at +0.35 V vs. Ag/AgCl. That at this potential the TiO$_2$ particles are neither reduced nor oxidized in the dark is seen in FIG. 25. At a potential of 0.25 V vs. Ag/AgCl (FIG. 24) the TiO$_2$ particles are still substantially reduced in the dark, i.e. electrons are transferred from the particles to the electrode. There is no such transfer at +0.35 V vs. Ag/AgCl (FIG. 25). Returning now to FIG. 23, one observes under an N$_2$ atmosphere a substantial current when the light is on. This current is again associated with electron transfer from the TiO$_2$ particles to the electrode. Saturation with air lowers the current only to about half of its value under N$_2$, and even saturation by pure O$_2$ lowers it further only slightly. Thus, even in an O$_2$ saturated solution the particles are substantially electron-charged because of their slow depolarization by O$_2$; evidently the rate of electron transfer to O$_2$ does not keep up with the rate of photogeneration of holes.

In FIG. 26, this situation is dramatically changed when 3% wt % Pd is incorporated in the surface of the particles. Under N$_2$ (left) a current associated with electron transfer from the particles to the electrode still flows; but when the solution is O$_2$ saturated there is no such current. The small reverse current in the presence of oxygen (electron transfer to the particles) may be caused by depletion of the particles of electrons through reduction of O$_2$ at the Pd catalyst. The initial anodic current spike at the first onset of illumination is apparently caused by slow processes in the dark, prior to the illumination period, are yet to be explained. We are addressing here, however, the steady state behavior during alternating illuminated and dark phases. We observe at steady state a slight decrease in the rate of electron transfer to the particles during the illumination period, during which electrons are photogenerated. The rate of O$_2$ reduction on the Pd activated TiO$_2$ particles remains, however, fast enough to prevent accumulation of electrons.

Figure 27A:
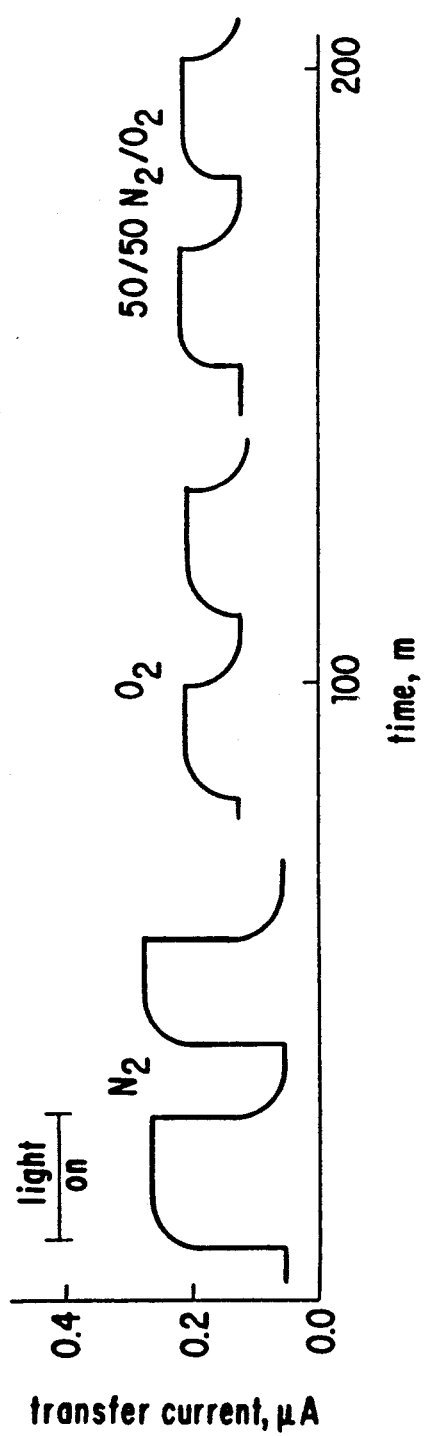
Figure 27B:
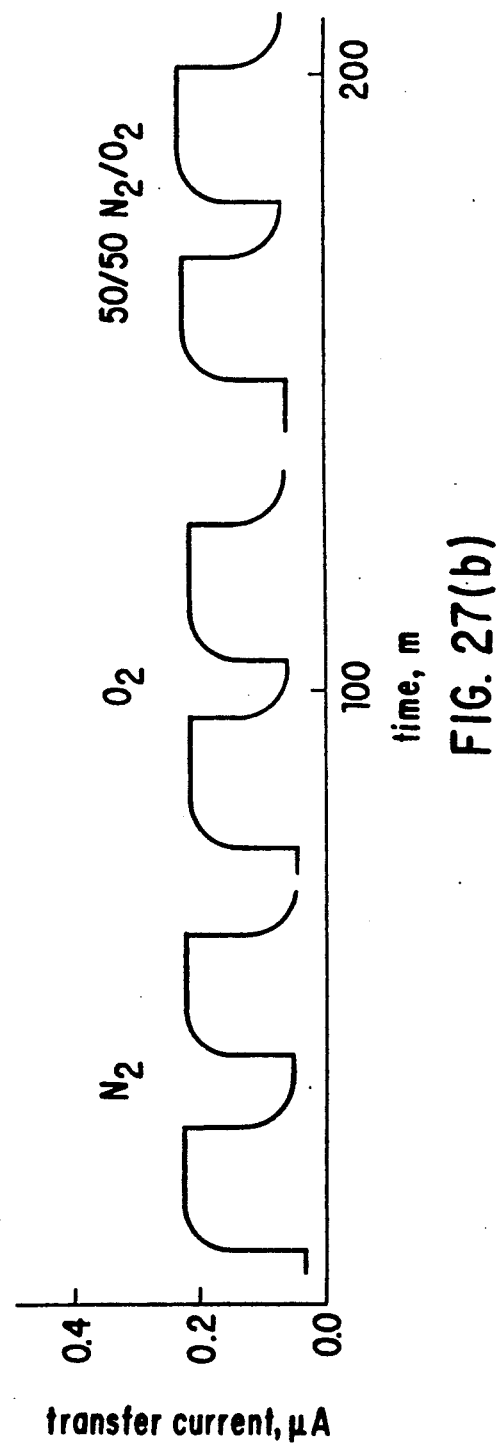

This situation holds for aqueous methanol and for aqueous methanol with 0.3 M NaCl. In concentrated NaCl brines (3 M NaCl) and in the absence of Pd the primary hole reaction is no longer generation of OH radicals. Instead, surface adsorbed Cl atoms are generated. The adsorbed Cl atoms and Cl$^-$ ions apparently prevent electron transfer to O$_2$. As a result, the current associated with electron transfer from the slurried particles to the glassy carbon electrode is atmosphere independent, the TiO$_2$ particles being identically negatively charged whether under N$_2$, under air or under pure O$_2$ (FIG. 27, bottom). This, however, is not the case at lower NaCl concentrations. In 0.3 M NaCl, (FIG. 27, top) the current changes with the atmosphere just as it does in water in the absence of NaCl (FIG. 27, top), showing that at 0.3 M NaCl the electrons are transferred to O$_2$.

2. Photooxidation of the CH$_3$CCl$_2$COO$^-$: The effect of Pd incorporation in the TiO$_2$ crystallites on the rate of HCl generation through the photoassisted oxidation of 10$^{-2}$ M sodium 2,2'-dichloropropionate in water is shown in FIG. 28. Pd° photoelectrodeposited on the particle's surface drastically increases the rate of HCl photogeneration even in amounts as small as 1 part per 10$^4$. Two different mechanisms for the photooxidation can be envisaged which result in different quantum yields for the production of HCl. We assume that oxidation leads to the formation of CO$_2$, CH$_3$COOH and HCl and is compensated by the reduction of O$_2$ to H$_2$O$_2$. If we neglect the apparently much slower further oxidation of acetic acid and processes in which H$_2$O$_2$ may be involved (photocatalytic decomposition, oxidation of CH$_3$COOH) then the net reaction (eq. 3 is:

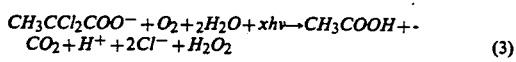
$$CH_3CCl_2COO^- + O_2 + 2H_2O + xh\nu \rightarrow CH_3COOH + CO_2 + H^+ + 2Cl^- + H_2O_2 \qquad (3)$$

The number of photons, x, can be 1 or 2, depending on whether (a) each of the two oxidation steps requires a photon or (b) the second step occurs spontaneously, resulting from injection of an electron into the semiconductor, i.e. involving (photocurrent doubling, well known in the photooxidation of some organic molecules on semiconductors, including TiO$_2$. The possible reaction sequences (eq. 4-7) are the following;

Sequence A:

$$h\nu \longrightarrow h^+ + e^- \tag{4a}$$

$$h^+ + H_2O \longrightarrow \cdot OH + H^+ \tag{5a}$$

$$\cdot OH + CH_3CCl_2COOH + H_2O \longrightarrow \tag{6a}$$

$$CH_3COOH + CO_2 + 3H^+ + 2Cl^- + e^-$$

$$O_2 + 2e^- + 2H^+ \longrightarrow H_2O_2 \tag{7a}$$

This sequence results in x=1. The apparent quantum yield for HCl production is in this case 2, while the primary yield is 1.

Sequence B:

$$2h\nu \longrightarrow 2h^+ + 2e^- \tag{4b}$$

$$2h^+ + 2H_2O \longrightarrow 2\cdot OH + H^+ \tag{5b}$$

$$2\cdot OH + CH_3CCl_2COOH \longrightarrow \tag{6b}$$

$$CH_3COOH + CO_2 + 2H^+ \; 2Cl^-$$

$$O_2 + 2e^- + 2H^+ \longrightarrow H_2O_2 \tag{7b}$$

In this sequence, x=2 and the primary quantum yield for the generation of $\cdot + OH$ radicals is the same as the apparent yield for HCl production.

The results of FIG. 28 are analyzed for the initial quantum yield in Table 2.

TABLE 2

EFFECT OF INCORPORATION Pd° IN THE SLURRIED TiO$_2$ PARTICLES ON THE EFFICIENCY OF THE PHOTOASSISTED OXIDATION OF $10^{-2}$ M SODIUM 2,2'- DICHLOROPROPIONATE BY OXYGEN

| % Pd | Rate of H+ Evolution moles h$^{-1}$ | Actual Quantum Efficiency | Primary Quantum Efficiency for Reaction Sequence A |
|---|---|---|---|
| 0.00 | 0.67 × 10$^{-3}$ | 0.20 | 0.10 |
| 0.01 | 2.2 × 10$^{-3}$ | 0.64 | 0.32 |
| 0.06 | 2.4 × 10$^{-3}$ | 0.70 | 0.35 |
| 0.3 | 2.6 × 10$^{-3}$ | 0.78 | 0.39 |
| 0.6 | 3.4 × 10$^{-3}$ | 1.02 | 0.51 |
| 2.0 | 4.8 × 10$^{-3}$ | 1.44 | 0.72 |
| 3.0 | 3.9 × 10$^{-3}$ | 1.16 | 0.58 |

Since the apparent yield exceeds a quantum efficiency of 1 in the best results, Sequence A must be the dominating mechanism. Step (6a) may include the following individual reactions:

$$CH_3CCl_2COOH + \cdot OH \longrightarrow CH_3CCl_2 + CO_2 + H_2O \tag{8}$$

$$CH_3CCl_2 + H_2O \longrightarrow CH_3COCl + Cl^- + 2H^+ + e^- \tag{9}$$

$$CH_3COCl + H_2O \longrightarrow CH_3COOH + H^+ + Cl^- \tag{10}$$

The highest primary quantum efficiency obtained in our experiments is 0.72. Losses are caused by recombination at the surface and at the metal particles, as well as by reverse reactions of electrons with ·OH radicals. The catalytic or quantum efficiency of photassisited oxidation is increased by Pd deposits on the TiO$_2$ particles by a factor of 7 at a Pd content of 2%. The efficiency decreases at higher Pd loadings.

We note that monolayer Pd coverage of 0.2 μm diameter TiO$_2$ particles corresponds to a loading of 1.8 weight %. Thus the best efficiency is reached approximately at about monolayer coverage. The deposited Pd° will not form a monolayer but will aggregate to clusters, leaving much of the surface available for oxidation of adsorbed H$_2$O by holes. Excessive covering may prompt, however, recombination. This explains the decrease in efficiency at higher loading of Pd. At very low coverage, corresponding to 1/200 of a monolayer, the quantum efficiency is tripled.

While Pd° catalysis of the photoassisted oxidation of 2,2'-dichloropropionate by oxygen is evident, a note of caution is required in the quantitative interpretation of the data. Specifically, other persons in the art have reported for anatase an increase by a factor of 1.5 in the rate of photoassisted oxidation of phenol when the pH drops from 6.5 to 3.5. With the concentration of HCl increasing in our experiments form $\sim 10^{-3}$ M to $\sim 10^{-2}$ M, the rates and quantum efficiencies of Table 1 are averaged values over a pH range between pH3 and pH2 and their accuracy is of ±20%. Nevertheless, because in all of our measurements the change in pH has been the same, the relative quantum efficiencies are quite accurate.

This invention has been disclosed in connection with specific embodiments. However, it will be apparent to those skilled in the art that variations from the illustrated embodiments may be undertaken without departing the spirit and scope of the invention.

What is claimed is:

1. A method for treating an oil film floating on a body of water, comprising the steps of:
    dispersing a plurality of water floatable particles on the oil film, wherein at least part of each particles, exterior surface is coated with a coating material that comprises palladium and an oxidation material that under illumination and in the presence of air is capable of accelerating the oxidation of organic compounds in the oil film; and
    allowing the particles to be exposed to solar illumination and ambient air such that the particles accelerate the oxidation of at least one organic compound in the oil film.

2. The method of claim 1 wherein the oxidation material is titanium dioxide, zinc oxide, zinc sulfide, or iron oxide.

3. The method of claim 1 wherein the coating material comprises approximately 0.001 to 3.0 percent by weight palladium.

4. The method of claim 1 wherein the coating material comprises approximately 0.01 to 0.5 percent by weight palladium.

* * * * *

UNITED STATES PATENT AND TRADEMARK OFFICE
CERTIFICATE OF CORRECTION

PATENT NO. : 5,194,161
DATED : March 16, 1993
INVENTOR(S) : Adam Heller and Heinz Gerischer It is certified that error appears in the above-indentified patent and that said Letters Patent is hereby corrected as shown below:

Column 30, line 49, claim 1, delete "particles," and insert therefor --particles'--.

Signed and Sealed this

Twenty-eighth Day of December, 1993

Attest:

BRUCE LEHMAN

*Attesting Officer*  *Commissioner of Patents and Trademarks*